US010551503B2

(12) United States Patent
Porretta

(10) Patent No.: US 10,551,503 B2
(45) Date of Patent: Feb. 4, 2020

(54) METHOD AND APPARATUS FOR DETERMINING A SCHEDULE FOR CONTACT WITH A CONSTELLATION OF SATELLITES

(71) Applicant: European Space Agency, Paris (FR)

(72) Inventor: Marco Porretta, AG Noordwijk (NL)

(73) Assignee: European Space Agency, Paris (FR)

( * ) Notice: Subject to any disclaimer, the term of this patent is extended or adjusted under 35 U.S.C. 154(b) by 264 days.

(21) Appl. No.: 15/656,779

(22) Filed: Jul. 21, 2017

(65) Prior Publication Data

US 2018/0031708 A1     Feb. 1, 2018

(30) Foreign Application Priority Data

Jul. 26, 2016   (GB) .................................. 1612917.3

(51) Int. Cl.
    *G01S 19/02*        (2010.01)
    *G01S 19/28*        (2010.01)
    (Continued)

(52) U.S. Cl.
    CPC ............ *G01S 19/02* (2013.01); *B64G 1/1085* (2013.01); *B64G 1/242* (2013.01); *B64G 3/00* (2013.01);
    (Continued)

(58) Field of Classification Search
    CPC ........ G01S 19/02; G01S 19/258; G01S 19/28; B64G 1/1085; B64G 1/242; B64G 3/00; H04B 7/19; H04B 7/195
    (Continued)

(56) References Cited

U.S. PATENT DOCUMENTS 5,788,187 A    8/1998   Castiel et al.
2001/0051521 A1   12/2001   Castiel et al.
(Continued)

OTHER PUBLICATIONS

Bodemann Christian et al., "GNSS Operations Challenges", 2013 6th International Conference on Recent Advances in Space Technologies, IEEE, Jun. 12, 2013, pp. 1151-1155.
(Continued)

*Primary Examiner* — Dao L Phan
(74) *Attorney, Agent, or Firm* — Park, Vaughan, Fleming & Dowler LLP

(57) ABSTRACT

A method and apparatus are provided for determining a schedule for a contact between a ground segment and a space segment. The ground segment comprises multiple ground stations, each ground station having one or more antennas, such that the overall number of ground station antennas in the ground segment is ($N_{ant}$), and the space segment comprises a constellation of satellites in orbit, in which the number of satellites is ($N_{sat}$). The method comprises selecting a subset of no more than $N_{ant}$ satellites from the $N_{sat}$ satellites for contact at a given epoch with the ground segment; and allocating each of the selected $N_{ant}$ satellites to the $N_{ant}$ antennas in a one-to-one relationship at the given epoch. The selecting of the subset of no more than $N_{ant}$ satellites from the $N_{sat}$ satellites comprises determining a subset of the $N_{ant}$ satellites that has maximum spatial diversity.

29 Claims, 11 Drawing Sheets
(11 of 11 Drawing Sheet(s) Filed in Color)

Contact Plan Computation

(51) Int. Cl.
*B64G 3/00* (2006.01)
*H04B 7/195* (2006.01)
*B64G 1/24* (2006.01)
*H04B 7/19* (2006.01)
*B64G 1/10* (2006.01)
*G01S 19/25* (2010.01)
*H04B 7/185* (2006.01)
*B64G 1/36* (2006.01)

(52) U.S. Cl.
CPC .......... *G01S 19/258* (2013.01); *G01S 19/28* (2013.01); *H04B 7/19* (2013.01); *H04B 7/195* (2013.01); *B64G 1/36* (2013.01); *H04B 7/1851* (2013.01)

(58) Field of Classification Search
USPC .................................................. 342/357.395
See application file for complete search history.

(56) References Cited

U.S. PATENT DOCUMENTS

| | | |
|---|---|---|
| 2002/0132577 A1 | 9/2002 | Draim |
| 2011/0169688 A1 | 7/2011 | Wyler |

OTHER PUBLICATIONS

Extended European Search Report, European Patent Application No. 17182670A, Jan. 9, 2018.
European Commission (EC); "Mid-term review of the European satellite radio navigation programmes", Report from the Commission to the European Parliament and the Council, Brussels, BE COM(2011) 5 final, Jan. 18, 2011.
Hofmann-Wellenhof et al.; "GNSS—Global Navigation Satellite Systems", Springer-Verlag, 2008, Wien AT.
EC and ESA; "Galileo Mission High Level Definition" Sep. 23, 2002, Brussels, BE.
Crawford et al.; "SGP4 Orbit Determination", 2008 AIAA/AAS Astrodynamics Specialists Conference, Aug. 18-21, 2008, Honolulu, Hawaii, US.
EU; "Galileo Open Service Signal-in-Space Interface Control Document", OS SIS ICD, Issue 1.2, Nov. 2015, Brussels, BE.
Subirana et al. "GNSS Data Processing—vol. I: Fundamentals and Algorithms", ESA Communications, TM-23/1, May 2013, Noordwijk NL.
Vincenty; "Direct and Inverse Solutions of Geodesics on the Ellipsoid with Application of Nested Equations", Survey Review (Published by Directorate of Overseas Surveys of the Ministry of Overseas Developement), vol. 23, No. 176, Apr. 1975, London, UK.

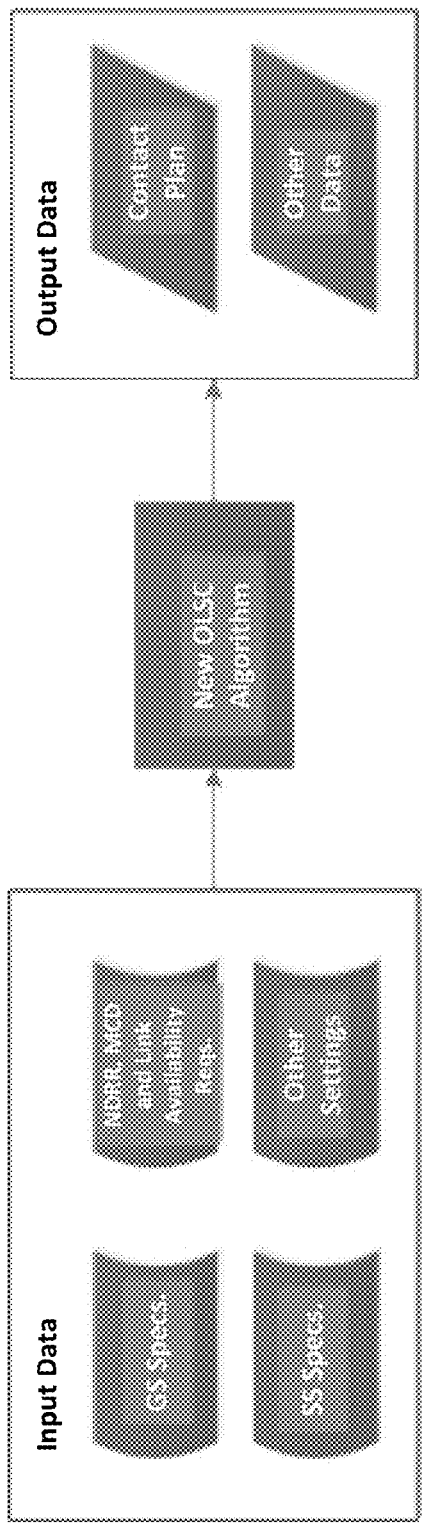
Figure 1 – "Black-box" description of the new ULSC algorithm.
Figure 2 – The two stages of the new ULSC algorithm.
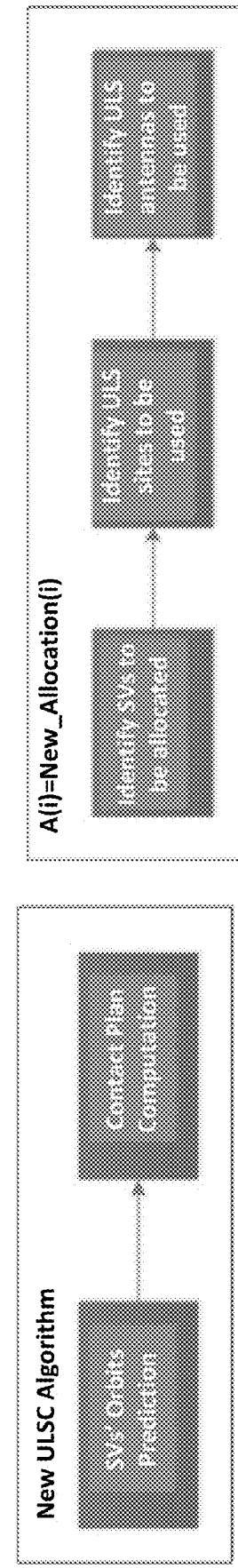
Figure 4 – The "New Allocation" function

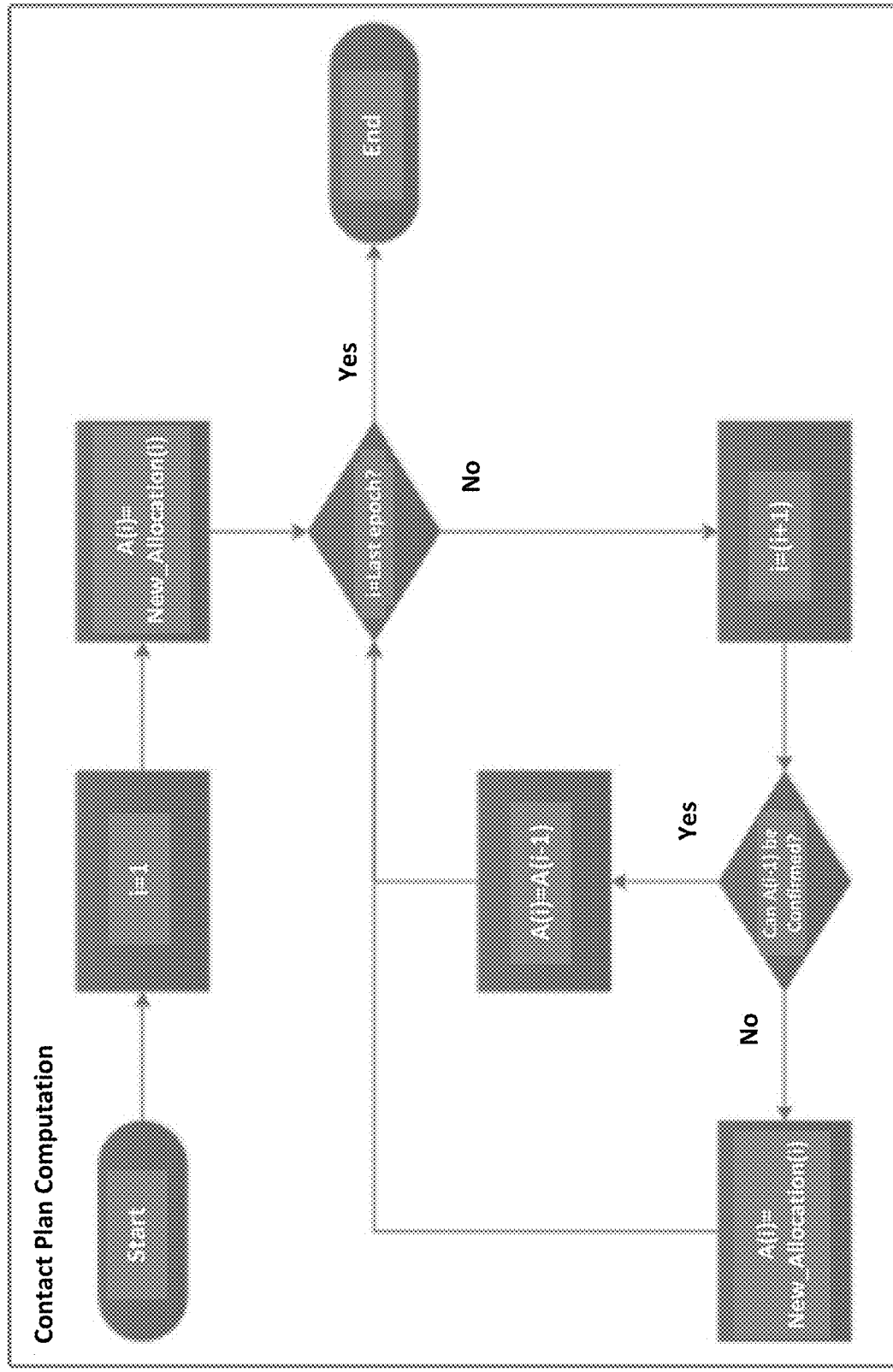
Figure 3 – Contact Plan Computation

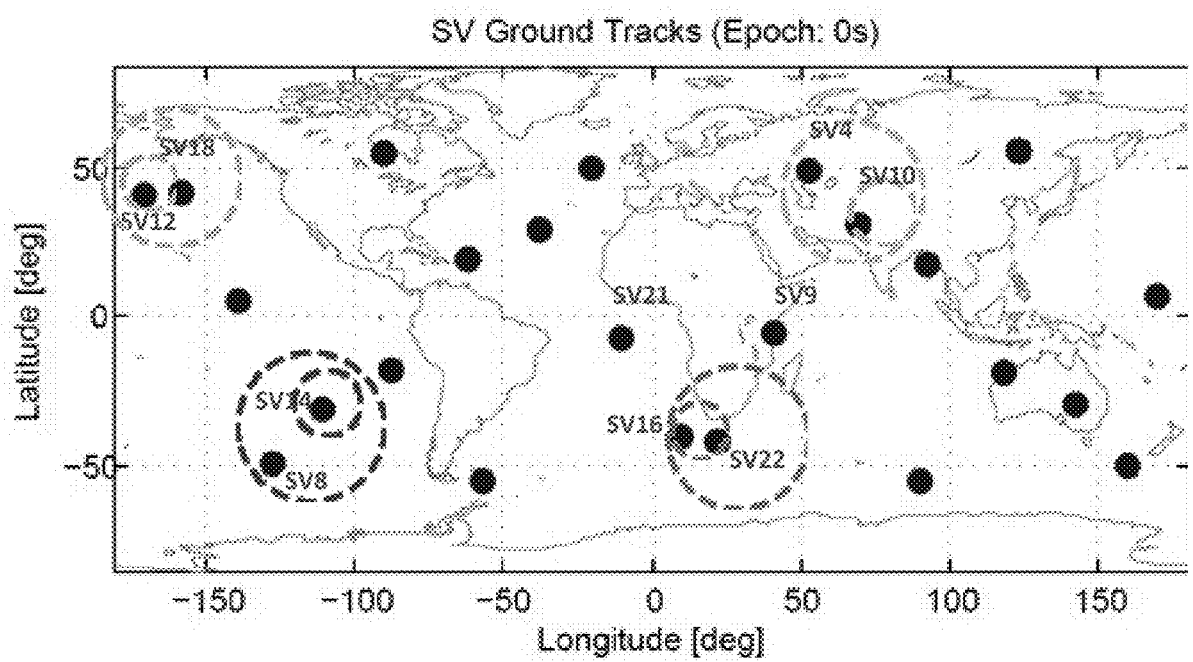
Figure 5 – A Worked Example: 24 SVs (Full Constellation) at the First Epoch
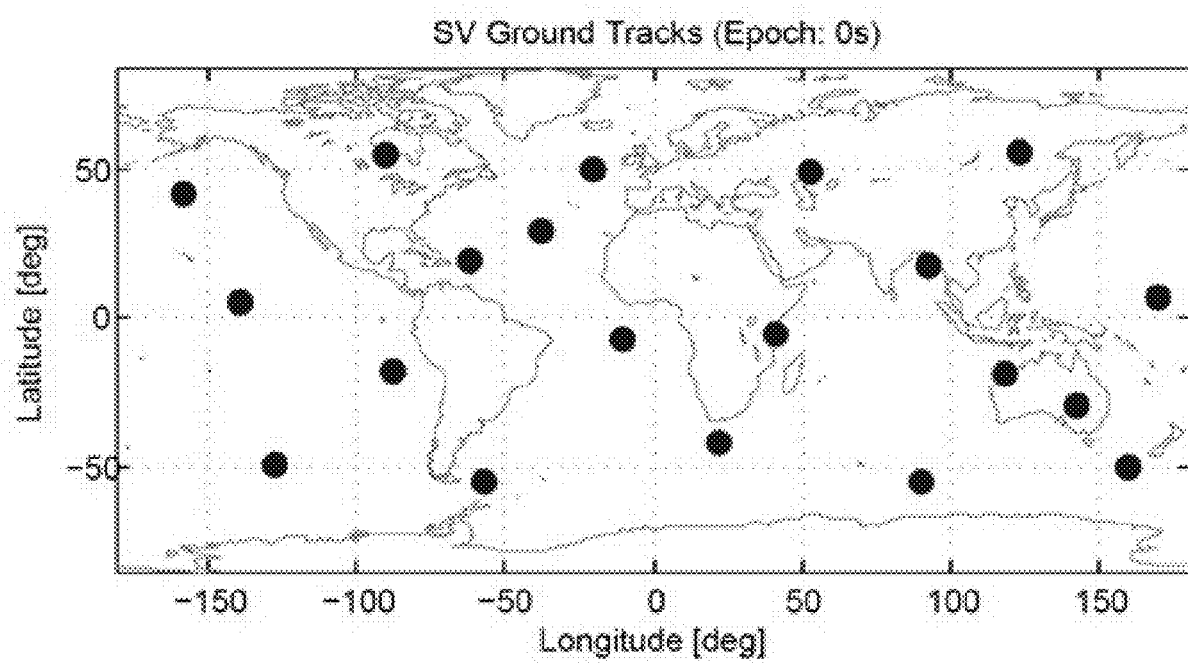
Figure 6 – A Worked Example: the 20 SVs Selected for Allocation

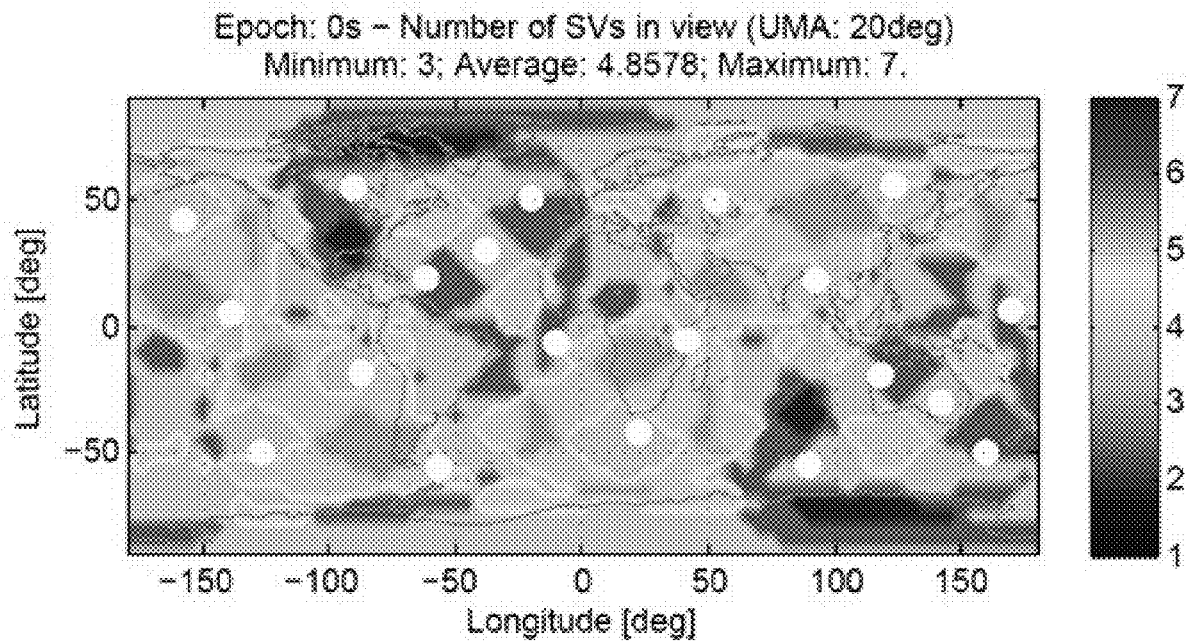
Figure 7 - First Epoch: No. of SVs in view (UMA: 20°) with the Selected Subset of 20 SVs
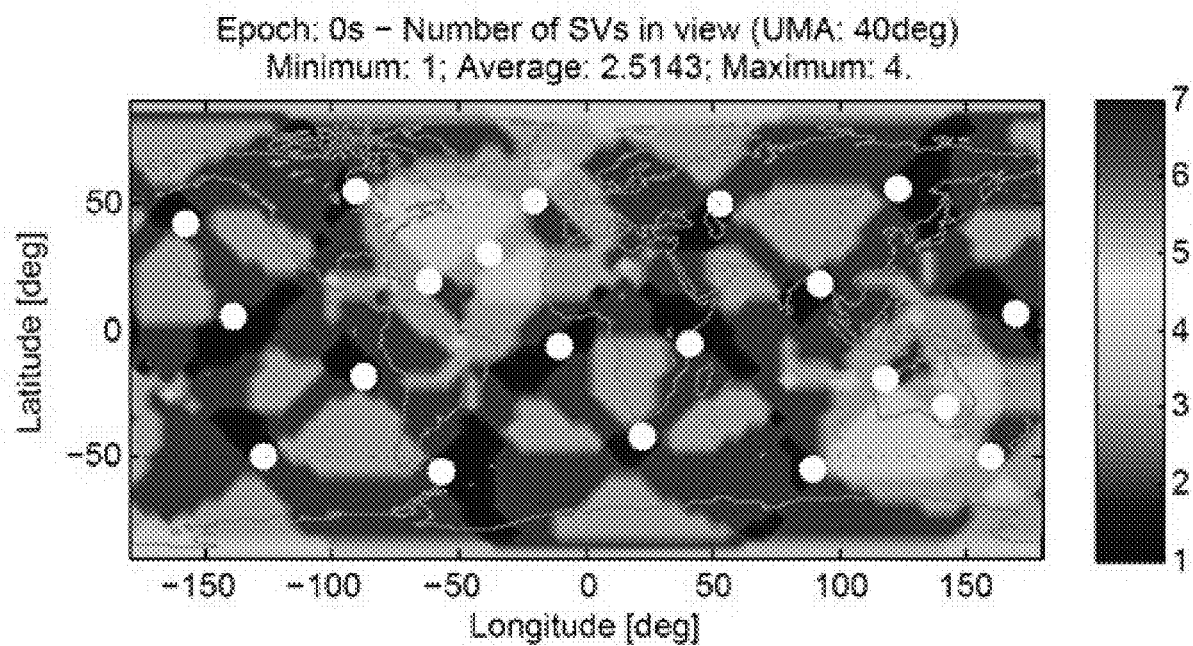
Figure 8 – First Epoch: Number of SVs in view (UMA: 40°) with the Selected Subset of 20 SVs

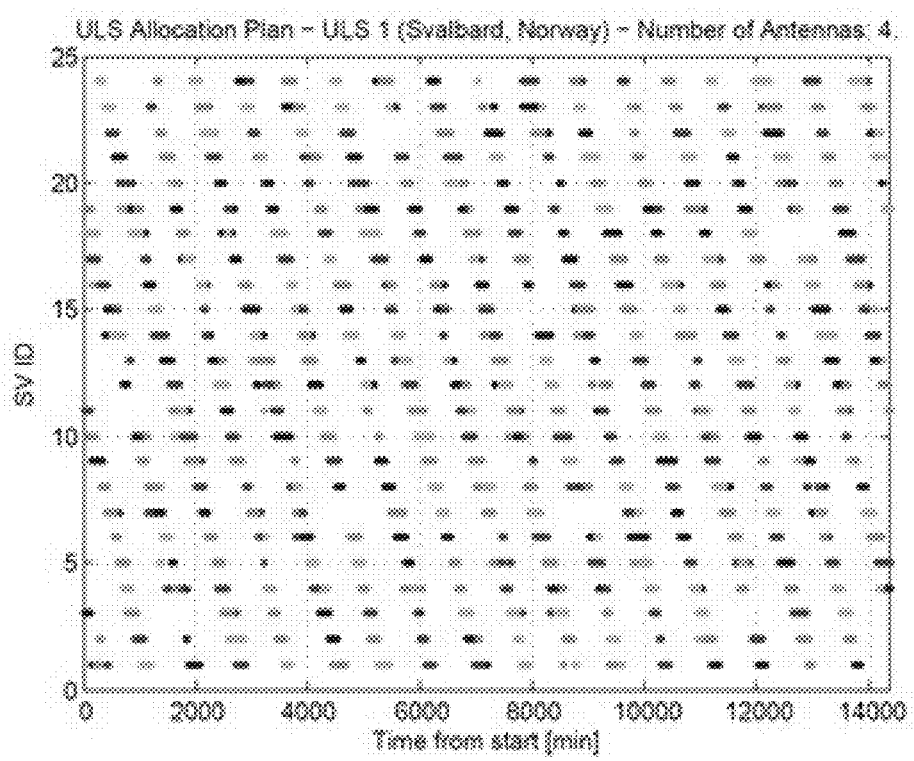
Figure 9 – Contact plan for the Svalbard ULS Site
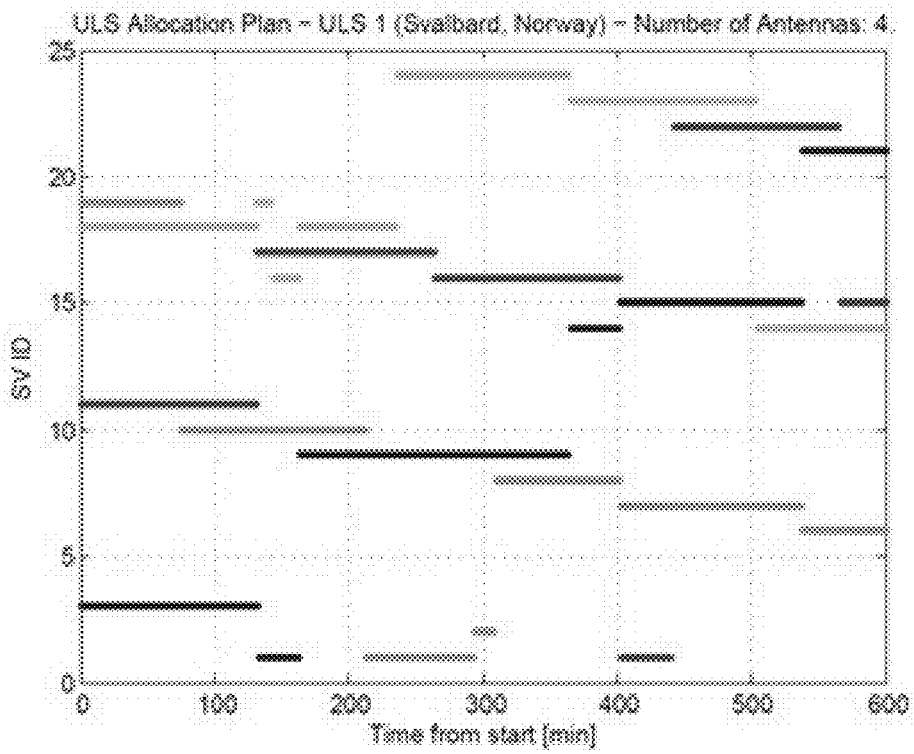
Figure 10 – Contact plan for the Svalbard ULS Site (first ten hours)

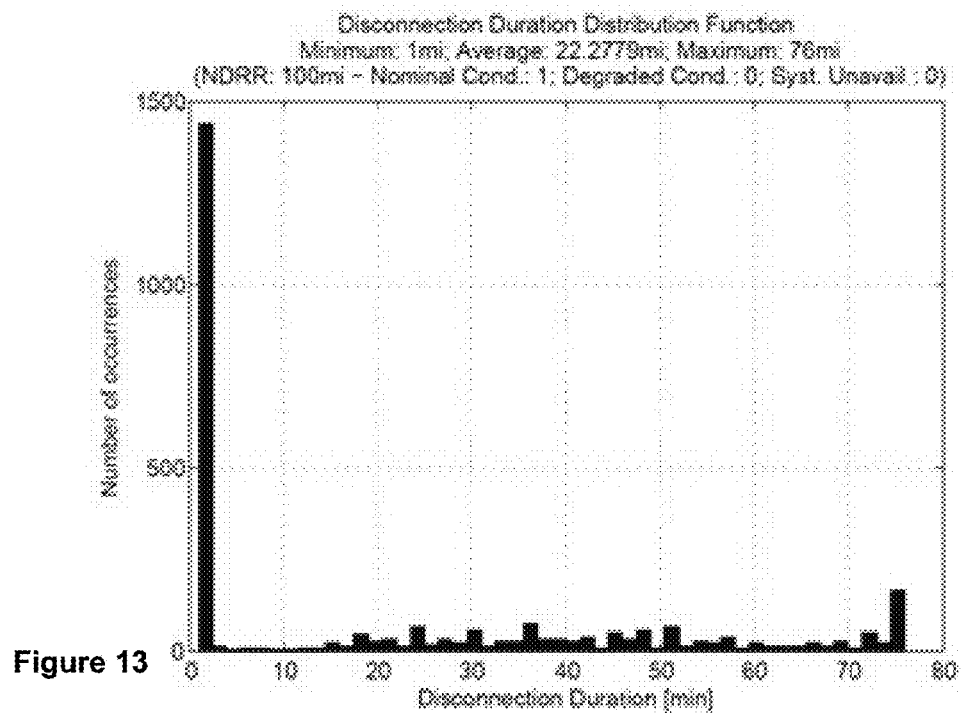
Figure 13
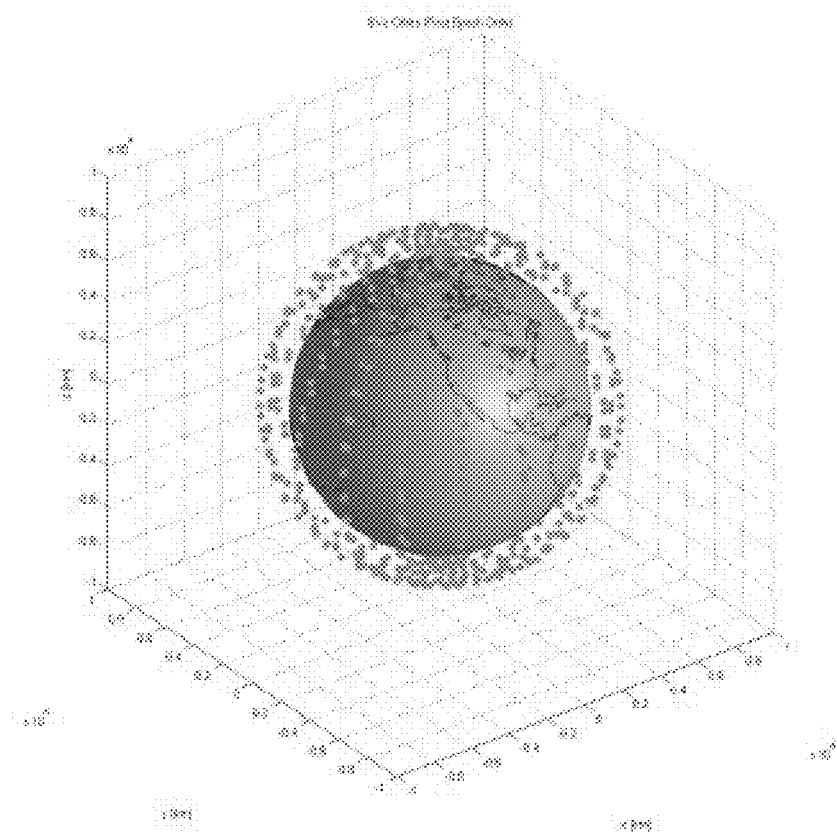
Figure 17 – The Mega-constellation used to evaluate the performance of the new ULSC algorithm

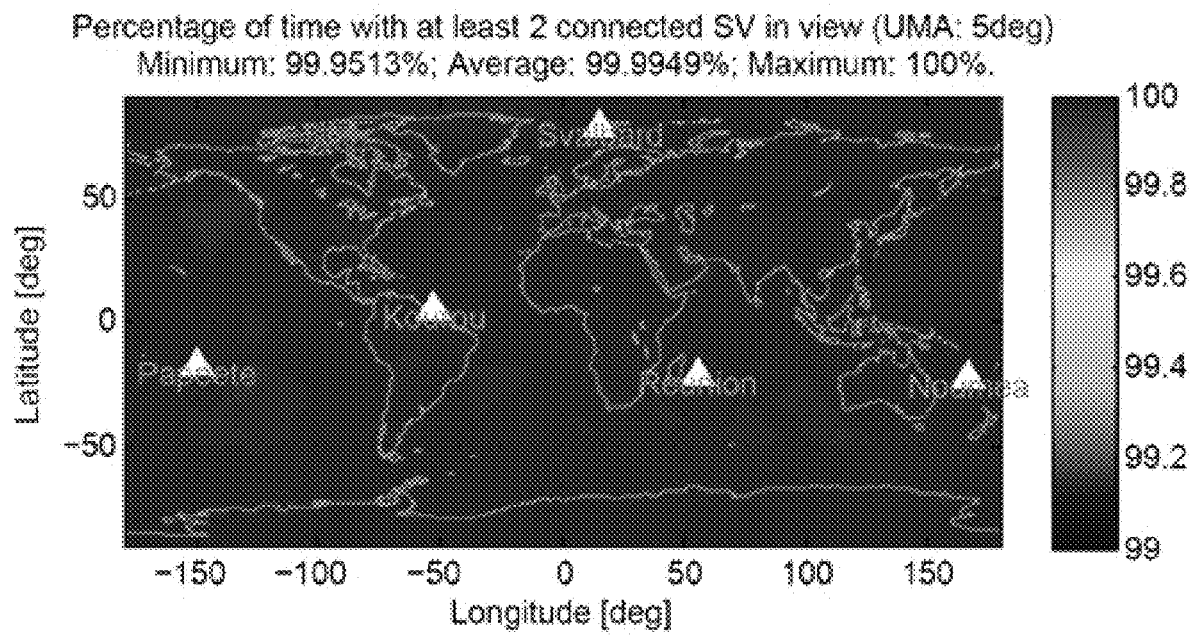
Figure 16
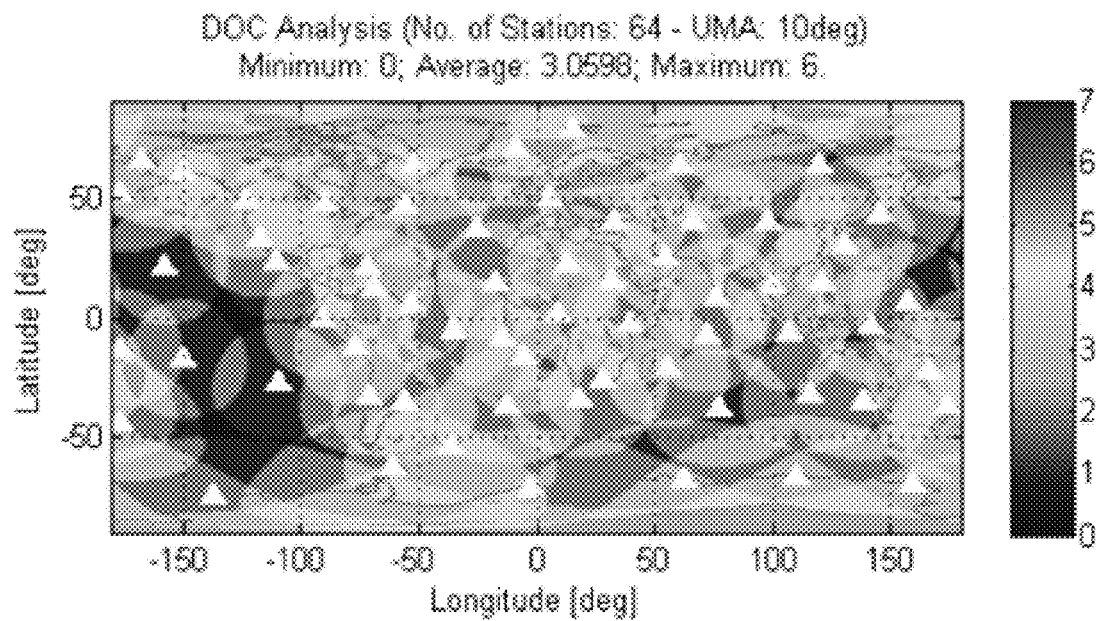
Figure 18 – The Network of GWs supporting the Mega-constellation under study: DOC analysis

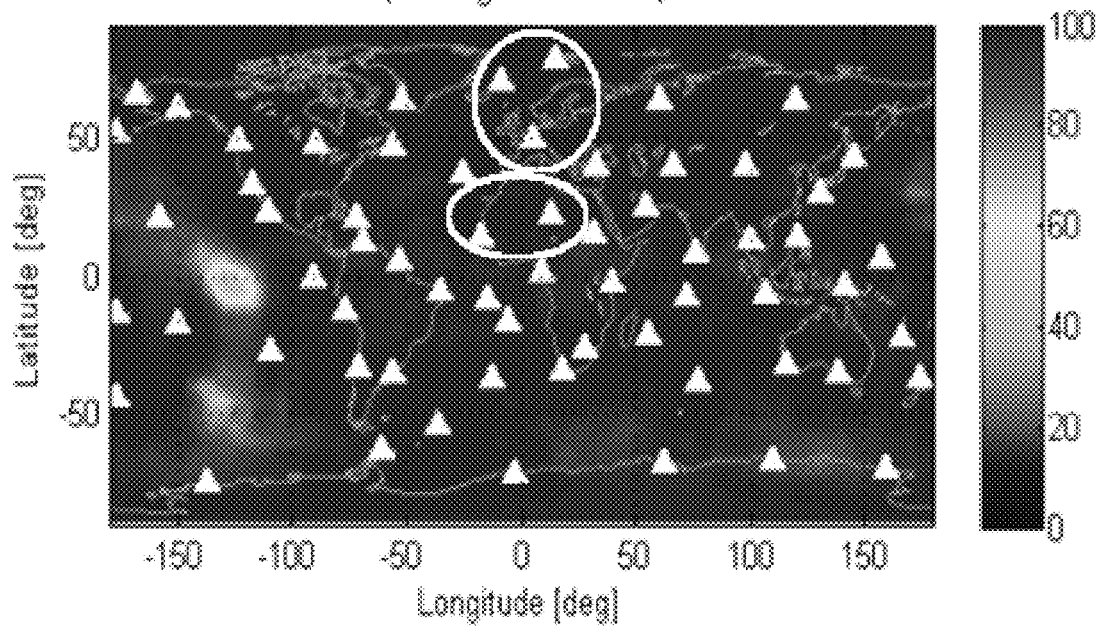
Figure 19 – The New ULSC Algorithm (Nominal Conditions) – Percentage of time with at least two connected SVs in view (UMA: 37°)
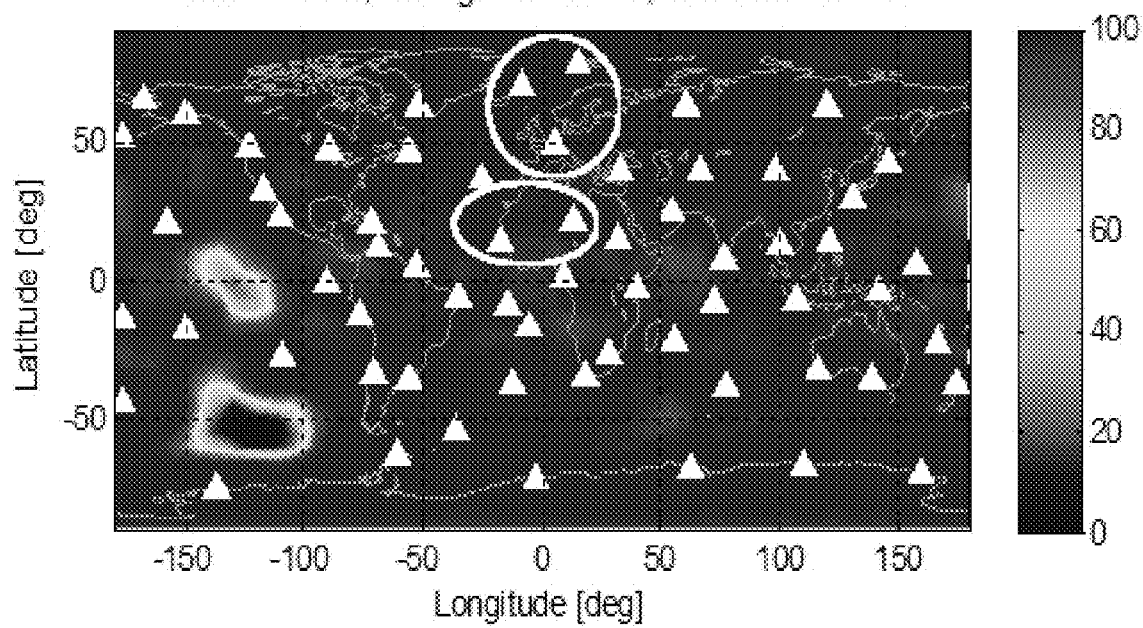
Figure 20 – The Reference ULSC Algorithm (Nominal Conditions) – Percentage of time with at least two connected SVs in view (UMA: 37°)

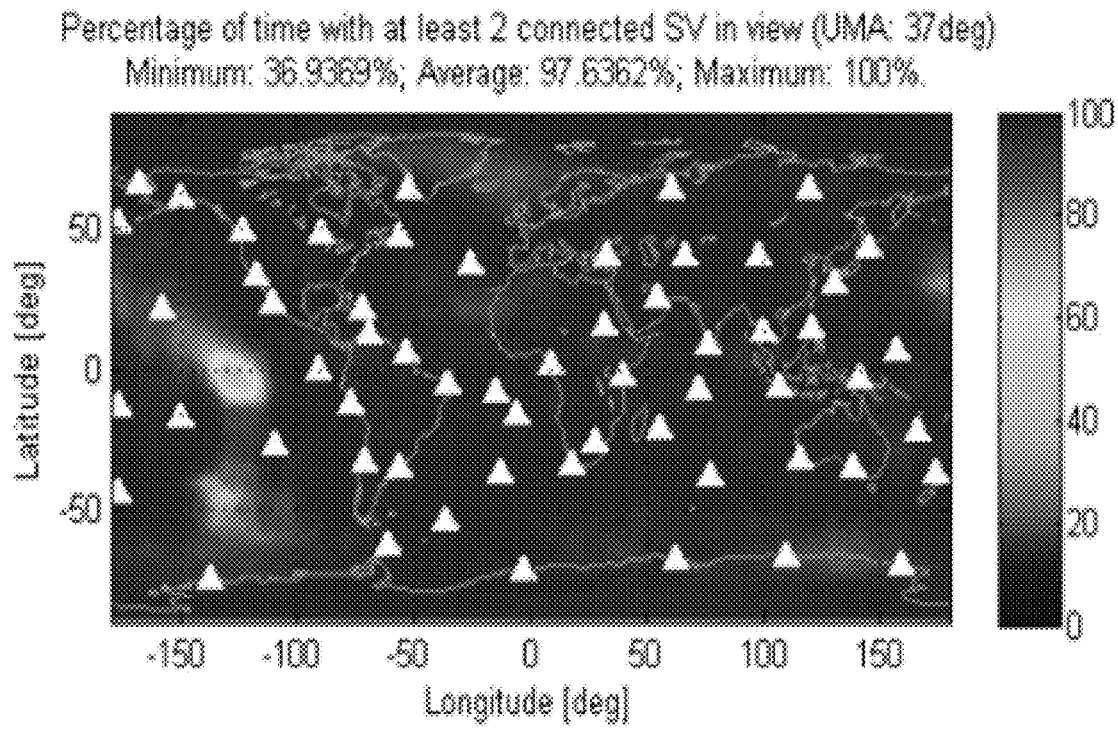
Figure 21– The New ULSC Algorithm (Degraded Conditions) – Percentage of time with at least two connected SVs in view (UMA: 37°)
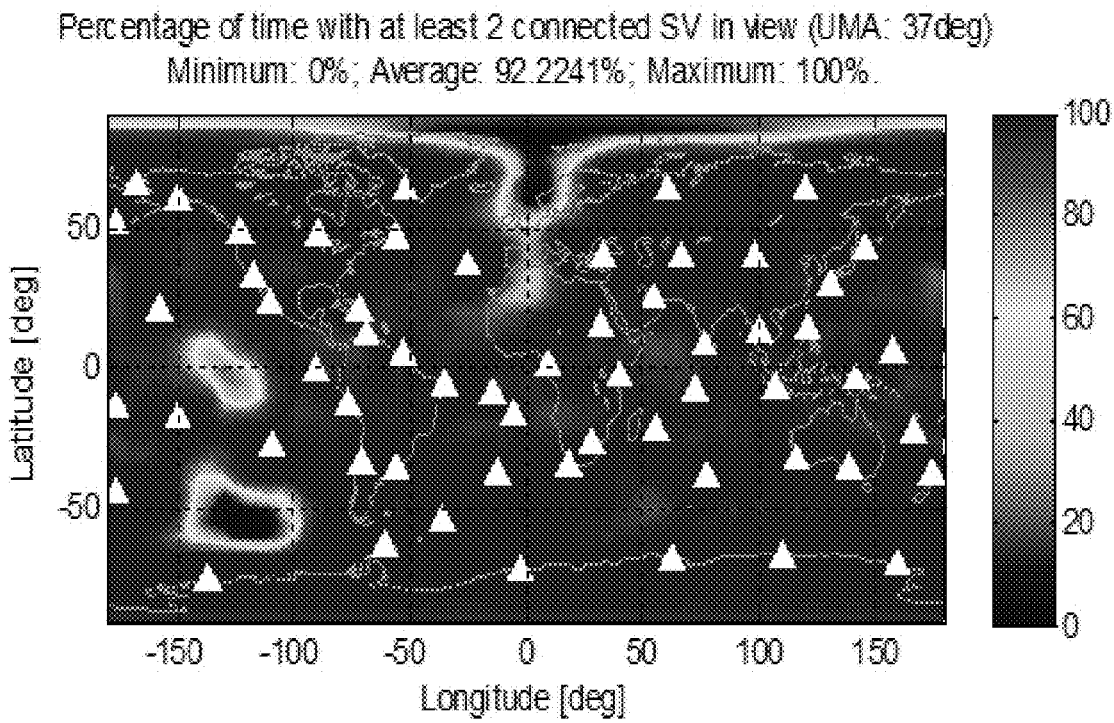
Figure 22 – The Reference ULSC Algorithm (Degraded Conditions) – Percentage of time with at least two connected SVs in view (UMA: 37°)

METHOD AND APPARATUS FOR DETERMINING A SCHEDULE FOR CONTACT WITH A CONSTELLATION OF SATELLITES

RELATED APPLICATION

This application hereby claims priority under 35 U.S.C. § 119 to United Kingdom Application No. 1612917.3 filed 26 Jul. 2016, the contents of which are incorporated by reference herein in their entirety.

FIELD

The present application provides a method and apparatus for determining a schedule for contact with a constellation of satellites, for example, as used in a global satellite navigation system.

BACKGROUND

Galileo is a state-of-the-art Global Satellite Navigation System (GNSS) which is currently being developed by the European Union (EU) and the European Space Agency (ESA). The system is designed to provide a highly accurate and guaranteed global positioning service under civilian control. It will be also interoperable with other GNSSs, such as the US Global Positioning System (GPS) and the Russian GLONASS system.

The Galileo mission and services have been elaborated during the initial definition phase in consultation with user communities and the EU Member States. Galileo will provide four basic "satellite-only" services to worldwide users. These include the Open Service (OS), the Commercial Service (CS), the Public Regulated Service (PRS), and the Search and Rescue Service (SAR). Additional details about the Galileo services can be found in [1].

The successful provision of these services depends on the system capability of broadcasting up-to-date navigation messages to the users. In particular, the different Galileo services are supported by four types of navigation messages: the Freely accessible (F/NAV), the Integrity (I/NAV), the Commercial (C/NAV), and the Governmental (G/NAV) navigation messages. The structure of these messages, together with the supported services, is described in many textbooks (e.g. [2]). As for other GNSSs, the content of each message is first prepared at the Ground Segment (GS) and then uplinked to the Space Segment (SS). Once the uplink is complete, the Galileo satellites ("Space Vehicles," SVs) broadcast the message on a global scale.

A key element of this process is the "dissemination function", i.e. the GS function which performs the uplink of the messages to the SS. This function uses a dedicated C-band channel and a network of ground antennas, available at different Uplink Station (ULS) sites. Furthermore, this uplink function is performed according to a given set of "dissemination requirements," which are determined based on the service level performance associated with each of the four Galileo services, [3]. For example, a necessary condition for the OS nominal accuracy is that the relevant messages are regularly updated. This leads, for each SV, to a requirement for the maximum interval (e.g. 100 minutes) between two successive contacts between the SV and one of the ULS antennas available at the GS.

More generally, three types of dissemination requirements are currently being considered for the provision of Galileo services. In particular, these consist of:

4. A Navigation Data Refresh Rate (NDRR) requirement, which specifies the maximum interval between two successive contacts between each SV and the GS;
5. A Minimum Contact Duration (MCD) requirement, which indicates the minimum duration of each contact; and
6. One or more Link Availability (LA) requirements (also referred to herein as LA specifications), which denote the percentage of time when a generic user is in view of one (or more) "connected" SVs, at a minimum elevation angle with respect to the user. In this context, "connected" indicates that there is a contact between the SV and one of the ULS antennas.

The NDRR is provided to ensure that the SVs are maintained with current (up-to-date) data. The MCD requirement is provided to ensure that the contact between the SV and the ULS is long enough to transmit the desired amount of data. The LA requirements are generally used for providing more sophisticated services, such as CS and SAR, which involve real-time communications, via the ULS antenna and the SV, between some terrestrial system and a user. A typical example is the SAR Return Link Alert Service, which provides a user in distress with an acknowledgment message informing them that their alert has been detected and located. Note that the NDRR and MCD requirements have broad relevance for GNSS systems in general, whereas the LA requirements are less common, since existing GNSSs may have only limited support (if any) for more specialized services.

In order to meet the above dissemination requirements, the dissemination function is performed according to a specific schedule which is computed by a dedicated Uplink Scheduling (ULSC) algorithm. In the specific case of the Galileo system, this is implemented at the Mission and Uplink Control Facility (MUCF) of the Galileo GS. In addition to the dissemination requirements, the ULSC algorithm takes into account the predicted orbits of the SVs and the actual availability of both the SVs and the ULS antennas (for example, if a particular ULS antenna is scheduled to be unavailable at a particular time because of planned maintenance). Based on this information, the ULSC algorithm computes a contact plan (or schedule) for ten sidereal days, which is the Ground Track (GT) repetition period of the Galileo constellation. The plan unambiguously indicates, for each "time sample" (or "epoch") and for each ULS antenna, the status of the antenna, i.e. whether the antenna shall be connected or not to a given SV. The existing ULSC algorithm currently available at the MUCF was primarily developed to address the NDRR and the MCD requirements, together with the original LA requirements to support the former Safety of Life (SoL) service. However, further development of services for Galileo, such as CS, has led to the need to support more complex LA requirements.

SUMMARY

The invention is defined by the appended claims.

Various implementations described herein provide a method for determining a schedule for contact between a space segment and a ground segment, the space segment comprising a constellation of satellites in orbit, in which the number of satellites is ($N_{sat}$), and the ground segment comprising multiple ground stations, each ground station having one or more antennas, such that the overall number of ground station antennas in the ground segment is ($N_{ant}$).

The method comprises selecting a subset of no more than $N_{ant}$ satellites from the $N_{sat}$ satellites for contact at a given epoch with the ground segment; and allocating each of the selected satellites to a respective antenna in a one-to-one relationship at the given epoch. Selecting the subset of no more than $N_{ant}$ satellites from the $N_{sat}$ satellites comprises determining a subset of no more than $N_{ant}$ satellites that has maximum spatial diversity at the given epoch.

Maximising the spatial diversity of the selected satellites helps to make efficient use of a distributed network of ground stations. (In this context, such spatial diversity may be defined, for example, as the union of the coverage areas of the allocated satellites). Further benefits of this approach are described below, for example in conjunction with meeting link availability requirements. Note that the selection method employed herein may not determine the subset of satellites that has the absolute maximum spatial diversity (in a strict mathematical sense) out of all possible subsets, but may instead determine a subset that has a high spatial diversity (relative in general to other possible subsets).

The approach described herein not only comprises generating a schedule (or contact plan), but may also comprise the follow-up task of implementing the contact plan. This is done by operating the ground segment to perform contact between the ground segment and the space segment in accordance with the determined schedule. The task includes, for example, ground antenna orientation for satellite acquisition and tracking, thus allowing effective data communications.

In addition to utilising such a schedule for operational control of the satellite constellation, the schedule may also be used for simulating and testing the satellite system—for example, determining what level of dissemination requirements can be supported by a given system (having a particular number of satellites and ground stations), or how many ground stations and antennas are needed to support a given set of dissemination requirements.

The approach described herein is primarily aimed at a situation in which the number of satellites, ($N_{sat}$), is greater than the number of ground station antennas ($N_{ant}$)—hence the need to select a subset of satellites for contact with respective antennas. However, the approach may also be relevant when $N_{sat} \leq N_{ant}$, for example because certain antennas are currently unavailable (e.g. due to maintenance). Another possibility is that the spatial distribution of satellites for a given epoch is slightly mismatched compared with the spatial distribution of the antennas—e.g. for a given epoch, the satellites are somewhat concentrated over a region (e.g. an ocean) with relatively few ground station antennas available, thereby preventing an antenna allocation to all satellites.

The method described herein can be utilised for any appropriate satellite system, for example, a global satellite navigation system, and/or a satellite telephone system and/or data communication system. The satellite constellation may comprise a Mega-constellation comprising 50 or more satellites (sometimes 100 or more or even several hundred, depending upon the particular system).

The type of communications performed during contact between a satellite and a ground station depends on the nature of the satellite system and the service being provided. For example, in a global satellite navigation system, the contact may be primarily in the form of an uplink from the ground stations to the satellites, which can then be used to update navigation and other data stored on the satellites (this data is then incorporated into the signal broadcast to earth from the satellites). In contrast, for a satellite telephone system, the contact may be primarily in the form of bi-directional voice communications, which are transmitted between a called and calling party via a satellite and a ground station. It will be appreciated that the method for determining a schedule for contact between a space segment and a ground segment described herein may be tailored as appropriate to the needs and operational requirements of any given type of satellite constellation and service.

Typically, the determination of an uplink schedule is subject to one or more dissemination requirements, for example, the one or more dissemination requirements may comprise at least one link availability requirement. Such a link availability requirement may define a set of locations and require a predetermined number (e.g. one or two) of connected satellites to be visible from each location in the set of locations. A connected satellite is a satellite in contact with a ground station antenna at the given epoch—this is important for providing various real-time (e.g. interactive) services, for example, safety or distress beacon, satellite telephone, etc. The set of locations may be globally distributed or may be limited to certain areas—e.g. seas/oceans, if the service is intended for maritime operations. A link availability requirement may specify a minimum elevation angle, and a satellite is only considered to be visible from a given location if it is above this minimum elevation angle at the given epoch and location. The minimum elevation angle may vary with location, e.g. it may be lower over maritime regions (seas/oceans), because such regions have clear lines of site. A given satellite constellation may have to support multiple link availability requirements—e.g. in respect of different services.

In the present approach, the link availability requirement(s) are not directly incorporated into the satellite allocation procedure itself, but rather are supported indirectly by determining a subset of satellites that has maximum spatial diversity at each given epoch. This maximisation of spatial diversity helps to ensure there is good support for any link availability requirement, by providing a wide distribution of connected satellites. In other words, high spatial diversity can be considered as a form of proxy for good link availability. After a schedule has been determined, the extent to which any link availability requirement(s) are satisfied by the schedule can then be verified by appropriate calculation.

The one or more dissemination requirements may also (or alternatively) comprise a requirement for a data refresh rate that defines the maximum time interval allowed between two successive contacts between a given satellite and a ground station antenna in the ground segment. Such a requirement helps to ensure that information in the satellite stays up-to-date—e.g. navigation data for a GNSS data, account data for a satellite telephone service. Such a requirement may be supported by selecting for the subset (of allocated satellites) any satellite that would otherwise exceed the maximum allowed time interval if not allocated contact with a ground station antenna at the given epoch. This may be achieved, for example, by making the step of determining the subset of satellites that has a maximum spatial diversity subject to the constraint that the determined subset must include any satellite that would otherwise exceed said maximum allowed time interval if not selected for allocation. In some implementations, this may include giving a higher priority for selection to a satellite that is approaching (but has not yet reached) the maximum allowed time interval (this can provide a useful safeguard for example in a case the satellite might be out of range of any ground station for the epoch when the maximum allowed time interval is finally reached).

The one or more dissemination requirements may also (or alternatively) comprise a requirement for a minimum contact duration for each contact between a satellite and a ground station antenna. Such a minimum contact duration may be used to ensure that a given data set (e.g. of predetermined size) can always be uploaded within a given contact. The minimum contact duration also prevents a schedule from switching a given antenna too rapidly between different satellites (which is less efficient, because it increases the proportion of time for which the antenna is moving to switch between satellites, and hence not transmitting). Such a requirement may be supported by selecting for the subset (of allocated satellites) any satellite that was in contact with a ground station for an epoch immediately preceding the given epoch if the duration of such contact is still less than the minimum contact duration. This may be achieved, for example, by making the step of determining the subset of satellites that has a maximum spatial diversity subject to the constraint that the determined subset must include any satellite for which the duration of contact would fall short of the minimum contact duration if not selected for allocation.

In some situations, a schedule may not be able to satisfy completely the dissemination requirements, i.e. for all locations and for all epochs, but should try to come as close as possible. In some cases, for example, a link availability requirement may itself specify how fully the requirement is to be met—e.g. the link requirement must be met for a specified percentage of epochs and/or for a given percentage of locations; other options may be to allow for a reduced number of satellites to be visible and/or a reduced elevation angle. The skilled person will be aware of further possible variations in how the link availability requirement may be expressed.

In some implementations, the step of deciding the allocation for a given epoch comprises determining whether maintaining a previous allocation of satellites to respective ground station antennas for the epoch immediately preceding the given epoch would breach any of the dissemination requirements for the given epoch. If not, the allocation of the immediately previous epoch can be maintained for the given epoch (and this allocation can then be further maintained for subsequent epochs if the dissemination requirements continue to be met). Note that confirming or repeating a previous allocation offers various benefits—for example, it is much quicker to determine the allocation for the next epoch (rather than having to determine a new allocation from scratch). In addition, maintaining allocations makes good use of ground station resources, since it minimises link availability loss due to switching an antenna from one satellite to another.

In some implementations, determining a subset of satellites that has maximum spatial diversity at the given epoch is performed on an iterative basis, with one satellite being excluded from the subset for each iteration, until the number of satellites in the subset exactly matches the number of available ground station antennas ($N_{ant}$).

The satellite for excluding at a given iteration may be chosen by identifying the satellite remaining in the subset (i.e. not yet excluded) that contributes least to spatial diversity. One way of identifying such a satellite is to choose from the pair of satellites remaining in the subset which has the smallest separation from one another. In this context, one way of quantifying such a separation is to evaluate the Great Circle Distance (GCD) between the Ground Tracks (GTs) associated with the two satellites, respectively.

This approach has various advantages. For example, there are no issues with lack of convergence, because the exclusion of satellites from the subset is always progressing in the same direction. Moreover, because each iteration only has to find a single satellite to exclude, there are (at most) only $N_{sat}$ options to consider (this is to be compared with the much higher complexity of trying to find the best combination of multiple satellites to exclude in a single iteration). One the other hand, other implementations may follow a different maximisation procedure for finding a subset of satellites having maximum spatial diversity, for example, using any known optimisation routine, such as hill-climbing, etc.). Note that at least some of the dissemination requirements may be incorporated directly into such an optimisation, for example, by allocating a cost to any failure to meet a given requirement. (This cost may be adjusted in a known and "controlled" fashion according to how strictly any given requirement is to be enforced).

In some implementations, at least one ground station comprises multiple antennas, and hence the step of allocation comprises allocating a satellite to a particular antenna of a particular ground station. Such allocation may be performed according to the following priority order:
(i) if the satellite was allocated to a particular antenna at the particular ground station for the epoch immediately preceding the given epoch, then maintain the allocation of the satellite to the particular antenna; (ii) otherwise, if there was a free antenna at the particular ground station for the epoch immediately preceding the given epoch (i.e. an antenna not assigned to a satellite), then allocate the satellite to the free antenna; (iii) otherwise, allocate the satellite to an antenna that was allocated to another satellite for the epoch immediately preceding the given epoch (for example, the antenna allocated to the satellite having the longest contact duration is selected).

Continuing with existing allocations supports having longer contact durations, and avoids antenna down-time while switching to a new target. Utilising a free antenna for a new contact helps with balancing the load of satellite allocations across antennas. Also, a free antenna may be configured and re-oriented in advance during the immediately preceding epoch, and would therefore be ready without delay for the new epoch, thus facilitating the acquisition of a new satellite. Finally, disconnecting an antenna which, at the epoch immediately preceding the given epoch, was allocated to the satellite having the longest contact duration promotes a more balanced distribution of the contact durations associated with all the satellites.

Various implementations described herein also provide an apparatus for determining a schedule for contact between a ground segment and a space segment. The space segment comprises a constellation of satellites in orbit, in which the number of satellites is ($N_{sat}$), and the ground segment comprising multiple ground stations, each ground station having one or more antennas, such that the overall number of ground station antennas in the ground segment is ($N_{ant}$). The apparatus is configured to: select a subset of no more than $N_{ant}$ satellites from the $N_{sat}$ satellites for contact at a given epoch with the ground segment; and allocate each of the selected satellites to a respective antenna in a one-to-one relationship at the given epoch. The step of selecting the subset of no more than $N_{ant}$ satellites from the $N_{sat}$ satellites comprises determining a subset of no more than $N_{ant}$ satellites that has maximum spatial diversity at the given epoch.

The apparatus may be implemented as one or more computing systems executing appropriate control software to provide the specified functionality. The apparatus may be provided with various additional features, such as described above in conjunction with the corresponding method for determining a schedule for contact between a ground segment and a space segment. Various implementations described herein provide an apparatus for controlling a ground station to provide contact between a space segment and a ground segment including said ground station. The space segment comprises a constellation of satellites in orbit, in which the number of satellites is ($N_{sat}$), and the ground segment comprising multiple ground stations, each ground station having one or more antennas, such that the overall number of ground station antennas in the ground segment is ($N_{ant}$). The apparatus is configured to perform contact with the satellites using a schedule for contact determined in accordance with a method such as described herein. The apparatus may be implemented as one or more computing systems executing appropriate control software to provide the specified functionality.

Accordingly, the approach described herein provides an Uplink Scheduling (ULSC) algorithm for use with Global Navigation Satellite Systems (GNSSs), such as the Galileo system, as well as for other types of satellite system. The approach is designed, inter alia, to meet the stringent dissemination requirements that are currently foreseen for the provision of the Galileo Commercial Service (CS). In particular, these dissemination requirements include "Link Availability" (LA) specifications that call for a minimum percentage of time ("availability") when a minimum number of satellites ("Space Vehicles," SVs), connected with an Uplink Station (ULS) antenna, shall be in view of a generic user at a minimum elevation angle. These LA requirements (LA specifications) were not fully considered in the design phase of the algorithm currently implemented at the Mission Uplink Control Facility (MUCF) of the Galileo Ground Segment (GS).

A major limitation of the original LA specifications is that, for all of them, only a unique (single) value of the minimum elevation angle is set, once and for all, at the beginning of the contact plan computation process. For that reason, these specifications cannot be directly re-used to support other Galileo services, such as CS, for which a different value of the minimum elevation angle is required as part of the LA specifications. It is also noted that using the most stringent (i.e. the largest) value of the minimum elevation angles for all the LA specifications is normally not a viable option, because it results in an unduly stringent constraint. Indeed, it is typically observed that the existing algorithm fails to converge if there are limited GS resources, i.e. when the number of SVs is larger than the number of ULS antennas.

In addition, this type of LA requirement is generally not considered in the ULSC algorithms available in the scientific literature. In particular, existing solutions generally take into account only specifications about (a) the maximum "gap" duration between two successive contacts (Navigation Data Refresh Rate, NDRR) and (b) the Minimum Contact Duration (MCD) of a contact between the SVs and the GS.

In the approach described herein, LA requirements are addressed by selecting a subset of the SVs to be allocated. In particular, the selection takes into account the requirements concerning a maximum gap duration and MCD while maximizing the spatial diversity of the resulting solution. As mentioned, such spatial diversity may be defined, for example, as the union of the coverage areas of the allocated satellites (SVs).

The performance of the approach described herein has been evaluated based on the final deployment stage (Full Operational Capability, phase 2, FOC-2) for the Galileo system. The performance has also been compared with that of the ULSC algorithm currently implemented at the Galileo MUCF (the "reference" algorithm). Numerical results show that, comparing the approach described herein to the reference algorithm, the average Disconnection Duration (DD) is reduced from 47 minutes to 22 minutes and the availability of links for providing the commercial service (CS) is significantly improved (by up to 7%). As a result, the LA requirements for CS are generally met using the new approach described herein, whereas these LA requirements are generally not met by the reference algorithm.

The performance of the approach described herein has been also evaluated in other satellite communication systems. In particular, a representative case of a Mega-constellation has been considered. This is particularly challenging because of the large number (several hundreds) of satellites in the space segment. As for the Galileo system, the performance of the new ULSC algorithm has been compared with that of a "reference" algorithm.

For the Mega-constellation under analysis, the reference scheme is a "standard" ULSC algorithm, in which each satellite is allocated to the closest (Euclidean distance) ground station in view, as long as uplink antennas are still available at that station. Numerical results show that, comparing the approach described herein to the reference algorithm, the dissemination performance is consistently improved. In particular, the new ULSC algorithm is shown to provide an increased robustness against possible failures in the GS infrastructure. Furthermore, compared to the reference algorithm, a similar level of dissemination performance can be obtained using the new ULSC algorithm and a reduced number (one-third less) of uplink antennas. This could potentially lead to a significant reduction (up to several tens of USD millions dollars) in the GS infrastructure deployment costs.

Color Drawings

The patent or application file contains at least one drawing executed in color. Copies of this patent or patent application publication with color drawing(s) will be provided by the Office upon request and payment of the necessary fee.

BRIEF DESCRIPTION OF THE DRAWINGS

Various implementations of the claimed invention will now be described by way of example with reference to the following drawings:

FIG. 1 is a high-level overview of some implementations for performing uplink scheduling using the approach described herein.

FIG. 2 shows more information about the contact plan computation performed by the ULSC algorithm box shown in FIG. 1 according to some implementations.

FIG. 3 shows a schematic flowchart for the contact plan computation shown in FIG. 2 according to some implementations.

FIG. 4 shows a schematic flowchart for the new allocation computation shown in FIG. 3 according to some implementations.

FIG. 5 and FIG. 6 are diagrams showing an example of using the new allocation computation shown in FIG. 4. In particular, FIG. 5 shows the locations of the full set of 24 SVs, while FIG. 6 shows the locations of the subset of 20 SVs that are chosen for allocation (to maximize spatial diversity).

FIG. 7 and FIG. 8 show, for the subset of SVs having the positions shown in FIG. 6, the number of SVs in view at each UGP. A User Masking Angle (UMA) of 20° and 40° is considered in FIG. 7 and FIG. 8, respectively.

FIG. 9 and FIG. 10 present an example of a contact plan computed by the approach described herein for the Svalbard ULS site. In particular, FIG. 9 shows the whole contact plan for all satellites across the whole duration of the plan (ten sidereal days), while FIG. 10 shows a zoom of the initial portion (first ten hours) of the contact plan of FIG. 9.

FIG. 13 is a plot illustrating an example of the distribution function of the Disconnection Duration (DD) determined using the approach described herein.

FIG. 16 is a plot illustrating an example, for a contact plan determined using the approach described herein, of the percentage of time with at least two connected SVs in view at an elevation of 5° or more.

FIG. 17 is a schematic diagram illustrating an example of a Mega-constellation (720 SVs) used to investigate the approach described herein.

FIG. 18 is a map of the network of gateways (ground stations) supporting the Mega-constellation of FIG. 17, and shows in particular a Depth Of Coverage (DOC) analysis for these gateways.

FIG. 19 is a plot of the percentage of time with at least two connected SVs in view of the relevant location (with a UMA of 37°) for a schedule determined using the approach described herein for the Mega-constellation of FIG. 17.

FIG. 20 is a plot (comparable to FIG. 19) of the percentage of time with at least two connected SVs in view of the relevant location (with a UMA of 37°) for a schedule determined using the reference algorithm for the Mega-constellation of FIG. 17.

FIG. 21 is a plot (comparable to FIG. 19) of the percentage of time with at least two connected SVs in view of the relevant location (with a UMA of 37°) for a schedule determined using the approach described herein for the Mega-constellation of FIG. 17. The plot refers to degraded conditions in which the circled ground stations of FIG. 19 are unavailable.

FIG. 22 is a plot (comparable to FIG. 19) of the percentage of time with at least two connected SVs in view of the relevant location (with a UMA: 37°) for a schedule determined using the reference algorithm for the Mega-constellation of FIG. 17. The plot refers to degraded conditions in which the circled ground stations of FIG. 19 are unavailable.

DETAILED DESCRIPTION

Overview

Figure 11:
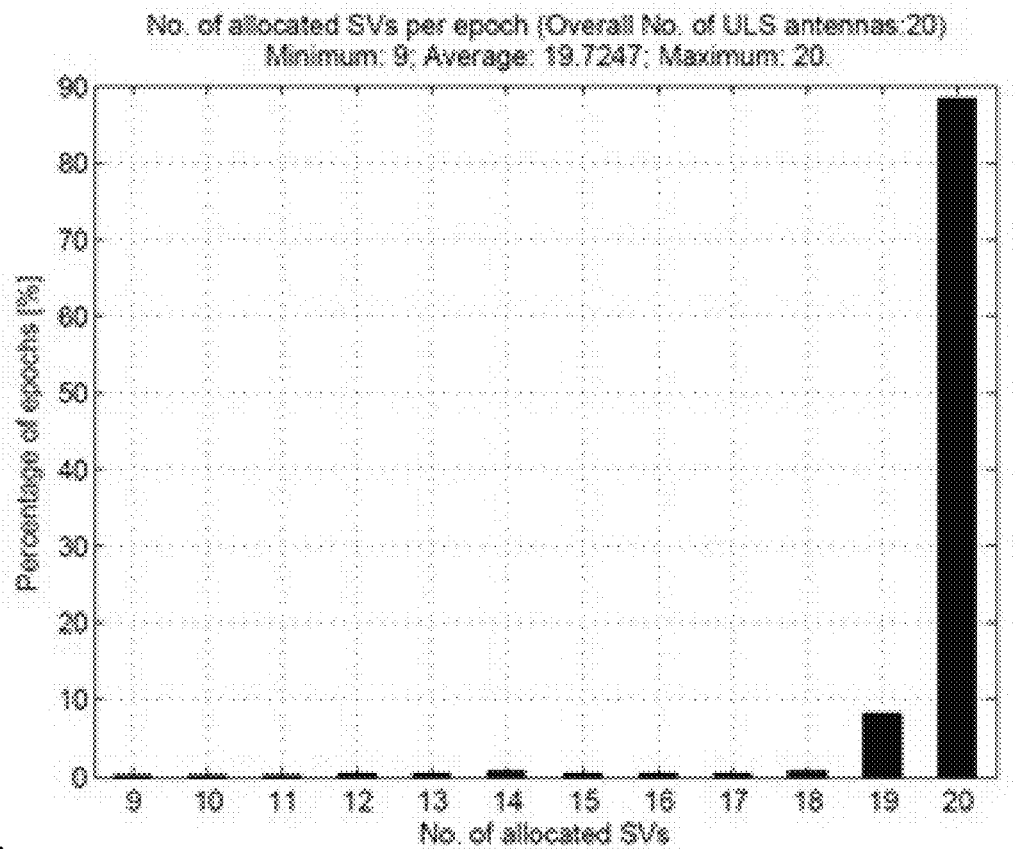
FIG. 11 is a plot showing an example of the proportions of epochs having different numbers of allocated SVs, derived from numerical simulation according to some implementations.

In the Galileo final deployment stage ("Full Operational Capability," stage 2, FOC-2), the dissemination function will rely on a GS which consists of five geographically distributed ULS sites (i.e. Svalbard, Kourou, Papeete, Reunion and Noumea), with four ULS antennas per site. Therefore, $N_{ant}=20$ ULS antennas will be overall available. These will be used to uplink, according to the computed schedule, the various navigation messages to a nominal Galileo constellation of $N_{SV}=24$ SVs, which will be deployed in a Walker 24/3/1 constellation.

With this configuration for both the GS and the SS, a preliminary investigation shows that the existing ULSC algorithm, is not able to meet the two LA requirements that are now foreseen for the provision of CS. Although these requirements are still under definition, they will be quite stringent because of the criticality of the service being offered. In particular, it is foreseen that each user shall be in view, 99% of the time, with at least:

C. Two connected SVs at an elevation angle of 20° or more; and

D. One connected SV at an elevation angle of 40° or more.

One of the main limitations of the existing ULSC algorithm is that only a single elevation angle can be indicated in the LA requirements which are considered in the contact plan computation process. In contrast, different elevation angles (20° and 40°, respectively) need to be considered in the two LA requirements A and B as specified above.

As a conservative approach, the most stringent (i.e. the largest) elevation angle (40°) could be set for both the requirements, A and B. However, in practice this is not a feasible option, as with the FOC-2 configuration for the GS, the existing algorithm is unable to find a solution. The same outcome is observed if an elevation angle of 20° is set for both the requirements, A and B. This lack of convergence is due to a limited number of GS resources, as the overall number of ULS antennas is smaller than the number of SVs in the constellation ($N_{ant}<N_{SV}$).

It is also noted that the existing ULSC algorithm was designed assuming a significantly larger number of ULS antennas available at the GS. In particular, the existing ULSC algorithm considered the baseline configuration indicated in the Galileo system Critical Design Review (CDR), where a network of nine ULS sites, with four antennas per site, was expected to serve a nominal constellation of 27 SVs. As a result, with the existing ULSC algorithm, the LA requirements (AandB) can be only met by expanding the ULS network beyond that currently planned for the FOC-2 deployment stage—either by increasing the number of antennas per ULS site and/or by adding new ULS sites. In particular, an analysis of the performance of the current algorithm indicates that a necessary, but not sufficient, condition to meet the CS dissemination requirements using the current algorithm is the deployment of an extended ULS network, in which the overall number of ULS antennas is larger than the number of SVs in the constellation ($N_{ant}>N_{SV}$).

The LA requirements for various Galileo services are still under consolidation. For this reason, these specifications are not considered by any of the ULSC algorithms currently available in the relevant scientific literature. For example, in [4], which describes an algorithm that has some similarities to the reference algorithm, the schedule is computed according to a "mixed-integer" model, in which different objective functions are used. However, only NDRR and MCD requirements are effectively considered. As LA requirements are not taken into account, the schedule of [4] does not improve the performance obtained with the ULSC algorithm currently implemented at the MUCF.

The ULSC approach described herein considers all the three types of dissemination requirements, i.e.: NDRR, MCD, and (multiple) LA specifications, with a view to meeting these requirements for the provision of Galileo services with the ULS network planned for the FOC-2 deployment stage. In the approach described herein, LA specifications are tackled by maximizing the percentage of users which are in view with the connected SVs. This is done by continuously allocating the subset of SVs able to maximise the "spatial diversity" of the solution. Such a spatial diversity may be defined as the union of the coverage areas associated with connected SVs. This approach leads to a much more efficient solution from a computational point of view (compared to an "optimal" selection scheme, where all the possible combination of $N_{ant}$ SVs are tested).

It is noted that, with the FOC-2 configuration, a maximum of $N_{ant}$=20 SVs can be allocated at each epoch. More generally, the approach described herein can be used to allocate either the full set of SVs, or some subset of the SVs. In particular, this depends on the comparison between the number of SVs, $N_{SV}$, and the number of available antennas, $N_{ant}$:

If $N_{ant}<N_{SV}$, only a subset of $N_{ant}$ SVs can be allocated. In this case, the subset which maximises the spatial diversity of the solution is identified by the proposed scheme and selected for allocation.

In contrast, if $N_{ant} \geq N_{SV}$, no selection is made, as the full set of $N_{SV}$ SVs can be allocated.

As described in more detail below, the performance of the new ULSC approach has been evaluated based on the FOC-2 configuration for the Galileo system in "nominal" conditions—i.e. it is assumed that all the elements of both the GS and the SS are operational, with no failures. The performance has also been compared with that of the ULSC algorithm (the reference algorithm) which is currently implemented at the MUCF.

It has been confirmed that the approach described herein is able to meet all three types of dissemination requirements (NDRR, MCD and LA). In addition, compared to the reference algorithm, several improvements in the dissemination performance have been observed, for example:

For each SV, the average gap duration between two subsequent contacts is reduced from 47 minutes to 22 minutes. This reduces the age of the navigation data broadcast by the SV and therefore has a positive impact on the expected performance at the user receiver.

The availability of the links needed for CS is significantly improved (by up to 7%). As a result, the LA requirements for CS (A and B as defined above) are met using the new ULSC approach (whereas these requirements are not satisfied by the reference algorithm).

The new ULSC algorithm is also more efficient in terms of antenna activity, which is defined as the percentage of time that a ULS antenna is connected to a SV. Compared with reference algorithm, the antenna activity is increased up to 5%. Therefore, the approach described herein also makes more efficient use of the available GS resources.

Further information about the approach described herein will now be presented in the following sections. In particular, these detail:

g) The dissemination requirements which drove the design of the new ULSC algorithm;
h) The new ULSC algorithm;
i) The proposed strategy for performance evaluation;
j) Numerical results, including a performance comparison with the reference algorithm;
k) Possible applications of the new ULSC algorithm to satellite communications systems; and
l) Some concluding remarks.

Dissemination Requirements

This section introduces five dissemination requirements which drove the design of the new ULSC algorithm. These requirements are indicated in Table 1. In addition to the NDRR ("N1") and MCD ("N2") specifications, there are also three LA requirements, which are needed for the provision of CS ("CS1" and "CS2") and SAR ("SAR1"), respectively.

TABLE 16

The five requirements to be satisfied using the new ULSC algorithm

| Requirement ID | Requirement Type | Associated Service | Requirement Description |
|---|---|---|---|
| N1 | NDRR | All | A NDRR of 100 minutes is required for each SV. |
| N2 | MCD | All | A MCD of 10 minutes is required for each contact. |
| CS1 | LA | CS | A worldwide availability of 99% is required for at least two connected SVs, at a minimum elevation angle of 20°. |
| CS2 | LA | CS | A worldwide availability of 99% is required for at least one connected SV, at a minimum elevation angle of 40°. |
| SAR1 | LA | SAR | A worldwide availability of 99% is required for at least two connected SVs, at a minimum elevation angle of 5°. |

In the design phase, the requirements of Table 1 were thoroughly analysed. This led to the identification of six design objectives, which in turn led to the development of the new ULSC algorithm.

The NDRR requirement indicates the maximum allowable age for the navigation messages (navigation data) broadcasted by the Galileo SVs. This age is determined based on two factors, the service level performance in terms of accuracy, [3], and the quality of the ephemeris and SV clock corrections determined at the GS for each SV. This requirement can be met by the ULSC algorithm considering as "critical" those SVs whose Disconnection Duration (DD) is about to reach the NDRR requirement (100 mi). Critical SVs are then allocated with a higher priority. This leads to the following design objectives:

D1: monitor the DD of each SV; and
D2: allocate with a higher priority critical SVs, i.e. those SVs that have an unacceptably large value for DD.

In the approach described herein, a DD value is deemed to be unacceptable as soon as it exceeds a given fraction of the NDRR requirement, i.e. $DD \geq (\alpha \cdot NDRR)$, with $0 < \alpha < 1$. This is the same scheme used in the reference algorithm. The value of the fraction $\alpha$ is a configuration parameter for the algorithm, but for the work described herein, a default value of 0.75 was adopted.

The MCD requirement specifies the minimum duration of each contact between a ULS antenna and an SV. In the approach described here, an MCD of 600 s (i.e. 10 minutes) is set. This value is determined based on the navigation message which has the longest duration (F/NAV). The MCD requirement is normally met by considering as "locked" those SVs which have just been allocated. As a result, the following design objectives, D3 and D4, are identified:

D3: monitor the Contact Duration (CD) of each SV; and
D4: consider as locked those SVs whose CD is shorter than (or equal to) the required MCD (i.e. $CD \leq MCD$).

In the approach described herein, the MCD requirement is met for every single contact. This is different from the reference algorithm, where, for each SV, the requirement only has to be met for at least one contact every day. For this reason, although the reference algorithm tends to increase as much as possible the duration of each contact, the resulting schedule often includes a number of contacts whose duration is below 10 minutes.

The LA requirements, which are needed for the provision of CS and SAR, can all be expressed using a common formulation based on of three specifications, i.e.:

4. A minimum number of connected SVs;
5. A minimum elevation angle (or "User Masking Angle," UMA) for the connected SVs; and
6. A minimum value, expressed as a percentage of time, for the worldwide link availability.

The LA requirements (two for CS, one for SAR) are summarized in Table 2.

TABLE 17

LA requirements

| Requirement ID | Service | Min. Number of Connected SVs | UMA [°] | Link Availability [%] |
|---|---|---|---|---|
| CS1 | CS | 2 | 20° | 99.00 |
| CS2 | CS | 1 | 40° | 99.00 |
| SAR1 | SAR | 2 | 5° | 99.00 |

The (effective) coverage area of a single Galileo SV is strongly dependent on the required value for the UMA. Specifically, the larger the specified UMA, the smaller the coverage area is. With a UMA of 5°, the percentage of the Earth surface covered by a single SV is about 35%. However, if the UMA value increases up to 20° or 40°, the corresponding percentage drops to 24% and 12%, respectively.

If the overall number of ULS antennas, $N_{ant}$, is smaller than the overall number of SVs, $N_{SV}$, the GS resources are limited. In other words, only a subset of SVs can be allocated at each epoch. In this case, the elements of the subset are selected with the objective of maximising the spatial diversity of the solution. In this context, the spatial diversity may be defined (for example) as the union of the coverage areas associated with the connected SVs: the larger the spatial diversity at a given epoch, the larger the probability that each user is, at that epoch, in view of one, or more, connected SVs. Accordingly, maximising spatial diversity at each epoch increases the likelihood that the LA requirements will be met over the whole duration of the contact plan computed by the ULSC algorithm. This maximisation of the spatial diversity is particularly important when a large UMA value (e.g. 40°) is required, since in this case the resulting coverage area of a single SV is significantly reduced.

Based on the above considerations, the following design objective, D5, is identified:

D5: maximise the spatial diversity of the solution at each epoch.

The approach described herein can be used to identify, at a given epoch, the subset of SVs that maximise the spatial diversity of the solution. A particular implementation of such a selection scheme is described in detail below. The proposed method also takes into consideration critical and locked SVs, i.e. SVs which must be allocated because of either the NDRR or the MCD requirement, respectively. As a result, the choice of the SVs to be allocated at each epoch is driven by all of the five dissemination requirements indicated above in Table 1.

As mentioned above, the reference ULSC algorithm allows for the specification of a single, unique value for the minimum elevation angle. This is then used in all the LA requirements to be considered in the contact plan computation process. However, if the minimum elevation angle associated with either the CS1 (20°) or the CS2 (40°) requirement is set for both the LA specifications, the reference algorithm fails to converge with the FOC-2 ULS network. As already noted, a necessary, but not sufficient, condition for the reference algorithm to converge is the use of an extended ULS network where $N_{ant} > N_{SV}$.

The link availability figures of the LA requirements (Table 2) are quite stringent (99%), and may limit the maximum number of handovers that can be included in a contact plan. A handover takes place whenever, according to the computed dissemination schedule, one of the two following situations occurs, i.e. either:

3. A SV must be handed over from one ULS site to another one; or
4. A ULS antenna must be disconnected from one SV and allocated to another one.

It can be shown that each handover results in a one minute disconnection gap. This duration is determined based on proper margins for all the operations which are needed to perform the handover, such as antenna re-orientation and SV acquisition. With an availability requirement of 99%, a one minute disconnection gap is a non-negligible figure. If the contact plan is calculated over ten sidereal days (i.e. 14,360 minutes), the availability of the link may be lost for a maximum of only 143.6 minutes. This forces the ULSC algorithm to minimise disconnection intervals, including those associated with unnecessary handovers.

As a result, the following design objective, D6, is identified:

D6: minimise the number of handovers.

In the ULSC algorithm described herein, the number of handovers is minimised by deciding, at each epoch, whether the previous allocation can be confirmed or not. In this context, the "previous allocation" term indicates the whole set of contacts which have been decided for the previous epoch. In particular, the decision strategy is based on the verification of both:

3. The visibility conditions, between each of the connected SVs and the relevant ULS site; and
4. The dissemination requirements indicated in Table 1.

The Uplink Scheduling Algorithm

This ULSC algorithm described herein will now be explained using a top-down approach, in which, starting from a "black-box" description, the functional role of each subsystem is introduced. For various design choices in the actual implementation, the underlying rationale is explained and generally mapped to the corresponding design objective (as per the previous section).

The black-box description of the ULSC algorithm described herein is shown in FIG. 1. For performance evaluation purposes, the algorithm has been implemented in a MATLAB environment (see http://uk.mathworks.com/products/matlab/). As shown in FIG. 1:

the input data includes: (a) the specifications for both the GS and the SS; (b) the dissemination requirements; and (c) other settings, such as the time step used in the contact plan computation, the contact plan duration and the user grid step.

the output data includes: (a) the contact plan; (b) the data for the verification of the dissemination requirements; and (c) further information to check the efficiency of the proposed schedule, such as the activity of the ULS antennas and the number of connected SVs.

The contact plan computation is performed by the ULSC algorithm box shown in FIG. 1. The computation process the ULSC algorithm to determine the contact plan is organized as two separate stages, as shown in FIG. 2. These two stages are:

A first, preliminary, stage, in which the orbits of the SVs are predicted over the whole contact plan duration; and A second stage, in which the contact plan itself is computed.

In the first stage shown in FIG. 2, the orbits of the SVs over the whole duration of the contact plan are predicted. A typical duration for the contact plan is ten sidereal days, i.e. 14,360 minutes, which exactly matches the Ground Track (GT) repetition period of the Galileo constellation. Using a time step of 60 s, this corresponds to $N_e$=14,360 time samples (or epochs). Depending on the type of data used to specify the SS, the prediction of the orbits may be performed according to different methods. For example:

c. Assuming that the orbital parameters (i.e. the six Keplerian elements) are available for each SV, either an unperturbed two-body orbit propagation model (e.g. see [6]) or a simplified perturbation model, [7], can be used to predict the orbital positions in accordance with standard procedures.

d. As an alternative, if almanac data is available, the algorithm described in the Galileo OS Signal-in-Space (SIS) Interface Control Document (ICD), [8], is used. This option can lead to an improved accuracy for the predictions of the orbits of the SV (compared with a), typically less than 2 km (1σ error), [9].

Once the orbits of the SVs have been predicted, the visibility conditions between each SV and (i) a ULS site or (ii) a User Grid Point (UGP) can be verified at each epoch. This computation of the visibility conditions is performed as per the reference algorithm, using standard expressions available in the open literature (e.g. [2] or [9]).

The second stage shown in FIG. 2 is now performed, namely the contact plan computation. In particular, for each epoch (i=1, 2, . . . , $N_e$), the algorithm evaluates an allocation A(i). This allocation is defined as a set of three M-dimensional vectors, A(i)={s(i), u(i), a(i)} in which:

M is the maximum number of SVs which can be allocated at each epoch. This is calculated as the minimum value between the overall number of ULS antennas, $N_{ant}$, and the overall number of SVs, $N_{SV}$, i.e.: M=min{$N_{ant}$, $N_{SV}$}.

Vector s(i) contains identification numbers (IDs) of the SVs (up to M) allocated at epoch i.

Vector u(i) contains the IDs of the respective ULS sites for each of the allocated SVs at epoch i; and Vector a(i) contains the IDs of the respective, specific, ULS antennas used for each of the allocated SVs at epoch i.

For example, if s(i)=[10 22 . . . ]$^T$, u(i)=[2 4 . . . ]$^T$ and a(i)=[1 2 . . . ]$^T$, this indicates that, at epoch i:

The SV "10" is allocated to the ULS site "2" using the ULS antenna "1";

The SV "22" is allocated to the ULS site "4" using the ULS antenna "2"; (etc.)

FIG. 3 shows a schematic flowchart of the workflow for the contact plan computation of FIG. 2 in accordance with some implementations. The first step in the workflow involves calculating an initial allocation, A(1). This is done by executing the "New Allocation" function (as described below) for the first epoch (i=1). The workflow now computes the allocation A(i) for all the other (subsequent) epochs in turn, i=2, 3, . . . , $N_e$. For each of the subsequent epochs, the workflow firstly checks if the allocation decided at the previous epoch, A(i−1), can be also confirmed at the current epoch, i (the details of this checking process are described below). In particular:

If the allocation can be confirmed, the algorithm sets A(i)=A(i−1);

Otherwise, a new allocation for the current epoch, A(i), is computed, by executing the "New Allocation" function for the epoch i.

The workflow of FIG. 3 terminates after the allocation for the last epoch (i=$N_e$) has been determined.

Note that, unlike for the reference algorithm, the approach described herein does not use any trial and error strategy to meet the dissemination requirements. Accordingly, no "back-jump" (or "big-jump") mechanism is implemented to try a new solution, should a previous, tentative, allocation fail to meet the requirements. As a result, the ULSC algorithm of FIG. 3 will necessarily converge.

If it is decided that the allocation set for the preceding epoch, A(i−1), can be confirmed for the current epoch, thus setting A(i)=A(i−1), no handovers are needed (Design Objective D6). For this reason, a previous allocation is confirmed whenever the circumstances permit. In particular, for the ULSC algorithm described herein, the preceding allocation is confirmed for the current epoch if (and only if) the following three conditions are all met:

4. There is no change in the visibility conditions, i.e. all the allocated SVs are still in view from the relevant (respective) ULS sites; and 5. There are no SVs which are becoming critical for the NDRR requirement, i.e. DD<(α·NDRR) remains valid for all the SVs; and 6. With the previous allocation, A(i−1), all of the required links are available at epochi.

The third condition is an important element to increase the link availability figures and is a significant aspect of the ULSC algorithm described herein. Thus, in the specific case of the LA requirements indicated in Table 2, this third condition for maintaining the previous allocation is verified if, at epoch i, all of the UGPs are in view of at least:

C. Two connected SVs at a minimum elevation angle of 20°; and

D. One connected SV at a minimum elevation angle of 40°.

In particular, the condition (A) ensures the instantaneous (i.e. at epoch i only) verification of both the CS1 and the SAR1 requirement, while the condition (B) ensures the corresponding verification of the CS2 requirement (see Table 2).

If one or more of the abovementioned conditions 1, 2 or 3 is not verified, the previous allocation is not confirmed. In this case, a new allocation must therefore be decided. This is done by executing the "New Allocation" function, as described below. It is noted that this function is also invoked when an initial allocation is selected, as no previous allocation is available for the first epoch (i=1).

FIG. 4 shows a schematic flowchart for the new allocation function represented in FIG. 3 according to some implementations. This function is organised in three different stages:

The first stage ("Identify SVs to be allocated" function) determines the s(i) vector, i.e. the IDs of the SVs to be allocated at the current epoch, i;

The second stage ("Identify ULS sites to be used" function) evaluates the u(i) vector, i.e. the IDs of the ULS sites corresponding to the allocated SVs; and, finally, The third stage ("Identify ULS antennas to be used" function) computes the a(i) vector, i.e. the IDs of the specific ULS antenna to be used for each SV allocation. Once the three stages are complete, the new allocation for epoch i is determined as A(i)={s(i), u(i), a(i)}.

The first stage is performed by the "Identify SVs to be allocated" function of FIG. 4. The objective is the determination of the s(i) vector, thereby selecting the subset of SVs to be allocated at epoch i. As mentioned above, the vector has M=min{$N_{ant}$, $N_{SV}$} components. Two cases are, therefore, identified:

If there are enough GS resources to allocate all the SVs in the constellation (i.e. $N_{ant} \geq N_{SV}$), no selection is needed. In this case, the s(i) vector contains the IDs of all the SVs and has, therefore, M=$N_{SV}$ elements.

In contrast, if the GS resources are limited (i.e. $N_{ant} < N_{SV}$), then only $N_{ant}$ SVs can be selected for allocation. In this latter case, which applies to the FOC-2 configuration (where $N_{ant}$=20 and $N_{SV}$=24), the resulting vector s(i) has only M=$N_{ant}$ elements.

With limited GS resources, the subset of $N_{ant}$ SVs to be allocated at epoch i is selected with the objective of maximising the spatial diversity of the proposed solution (Design Objective D5). The recommended selection scheme determines a subset to include SVs which are either:

c) critical because of the NDRR requirement (Design Objective D2); or d) locked due to the MCD requirement (Design Objective D4).

These SVs are considered as "High Priority" (HP) SVs and, therefore, always included in the subset of SVs to be allocated.

The overall subset of $N_{ant}$ SVs is then chosen to maximise the spatial diversity. In theory, this selection could be performed by testing all possible subsets of SVs (subject to D2 and D4) to see which represents the optimal solution. However, this option is relatively expensive from a computational point of view, as the number of possible subsets is usually very large. For example, with $N_{SV}$=24 and $N_{ant}$=20, more than 10,000 possible subsets might be considered at each epoch, as: $C_{N_{ant}}^{N_{SV}} = C_{20}^{24} = (24!)/(20!\cdot 4!) = 10,626$. The exact number of subsets to try at a given epoch will normally be reduced below this figure due to a certain number of critical or locked SVs to be necessarily included in each possible subset.

As an alternative to the above approach of trying every possible combination, a more computationally efficient selection scheme is proposed here. Specifically, the subset of $N_{ant}$ SVs is obtained by discarding N=($N_{SV}$−$N_{ant}$) SVs which are identified as those SVs that are likely to make only a relatively minor contribution to the spatial diversity of the solution because they have a ground track (GT) which is too close to those of other SVs.

The distance between respective GTs of two SVs is evaluated using the Great Circle Distance (GCD), which is defined as the shortest distance between two points on the surface of a sphere, measured along the surface of the sphere. More particularly, the GCD between two GTs on the Earth's surface is evaluated herein using the Vincenty formula, [10].

The N SVs to be discarded are identified through an iterative process. Before the first iteration, possible SVs (if any) which are: (a) not allocated AND (b) not in view of at least one ULS site over the MCD interval, are immediately excluded. This preliminary check excludes potential contacts that would not be able to meet the MCD requirement.

Next, at each iteration, the pair of SVs which has the smallest GCD between their respective GTs is identified. Note that this search for such a pair of SVs is limited to those SVs which have not already been excluded by a previous iteration of this procedure.

After detecting the pair of SVs which are closest together (in terms of their respective GTs), one, and only one, of the three following mutually exclusive alternatives is possible, i.e.:

4. Neither of the SVs in the pair is a HP SV. In this case, the SV from this pair which has the smallest GCD from the GT of all the other SVs in the subset is discarded.

5. Only one of the SVs in the pair is a HP SV. In this case, the other SV in the pair is discarded.

6. Both of the SVs in the pair are HP SVs. In this case, neither SV is discarded.

Note that for alternative (1) above, it is generally assumed that the two SVs are closest enough together so as to effectively provide coverage of the same area.

It will be appreciated that for each iteration, none of the alternatives 1, 2, or 3 leads to the exclusion of a HP SV. Therefore, with the selection scheme described herein, the HP SVs are always included in the resulting subset, s(i).

After one of the above alternatives has been identified and a SV discarded (as appropriate), the algorithm searches for next pair of closest SVs, and continues the iterative selection scheme until the N SVs have been discarded.

Note that for alternatives 1 and 2, the next pair of closest SVs is determined across the remaining subset of SVs (after the identified SV has been discarded). This is not the case for alternative 3, where both SVs in the pair are HP SVs. As neither of them can be discarded, the next pair of closest SVs is the pair of SVs having the second (or next) smallest minimum distance, immediately after the pair that was previously identified in alternative 3.

FIG. 5 illustrates an example of using the new allocation procedure shown in FIG. 4, in which both the GS ($N_{ant}$=20) and the SS ($N_{SV}$=24) are as specified for the FOC-2 deployment stage. In particular, FIG. 5 depicts the initial allocation (i=1), for which there are no HP SVs (no SV can be critical because of the NDRR requirement or locked due to the MCD requirement).

Each of the 24 SVs is shown to be in view of at least one of the ULS sites for the whole of the MCD interval (10 minutes). For that reason, no SV is immediately excluded. Therefore, the iterative selection scheme must discard N=($N_{SV}$−$N_{ant}$)=4 SVs. This requires four iterations, as follows:

At the first iteration, all the 24 SVs are considered. The pair of SVs which has the smallest GCD between their respective GTs is the pair (SV16, SV22). The couple is indicated by a (green) circle in FIG. 5 (located to the south of Africa). Since none of the 24 SVs is a HP SV for this initial allocation, we are in a situation corresponding to the first alternative identified above. Therefore, we select one of SV16 or SV22 for discarding, namely the one which has the smallest GCD from the GT of all the remaining SVs. Specifically:

For the GT of SV16, the closest GT is that of SV22 (already considered) and, immediately after, the GT of SV21, which is located in a north-west direction—Let $d_{16,21}$ represent the GCD between these two GTs.

For the GT of SV22, the closest GT is that of SV16 (already considered) and, immediately after, the GT of SV9 which is located in a north-east direction—
Let $d_{22,9}$ represent the GCD between these two GTs. As $d_{16,21}$ is shown to be smaller than $d_{22,9}$, it is SV16 which is discarded at this iteration, as indicated by the inner, green, circle in FIG. 5.

Once SV16 is removed, the second iteration begins, which uses in effect the same process for discarding a SV as for the first iteration. Now, only the remaining 23 SVs are considered (excluding SV16), and for this subset, the pair (SV12, SV18) is identified as having the smallest GCD between their respective GTs. This pair is indicated in FIG. 5 by the (orange) circle, which is located just south of Alaska. SV12 is then discarded from this pair (inner orange circle), because the GCD between its GT and that of the next closest SV (to the south-west) is less than the GCD between the GT of SV18 and that of its next closest SV.

After SV16 and SV12 have been removed, the third iteration begins, with only the remaining 22 SVs being considered. For this subset, the pair (SV4, SV10) is identified as having the smallest GCD between their respective GTs. This pair is indicated in FIG. 5 by the (cyan) circle, which is located over West Asia. SV10 is then discarded from this pair (inner cyan circle), because the GCD between its GT and that of its next closest SV (to the south-east) is less than the GCD between the GT of SV4 and that of its next closest SV.

After SV16, SV12 and SV10 have removed, the fourth (and final) iteration begins, with only the remaining 21 SVs being considered. For this subset, the pair (SV8, SV14) is identified as having the smallest GCD between their respective GTs. This pair is indicated in FIG. 5 by the (red) circle, which is located over the south Pacific ocean. SV14 is then discarded from this pair (inner red circle), because the GCD between its GT and that of its next closest SV (to the north-east) is less than the GCD between the GT of SV8 and that of its next closest SV.

After SV16, SV12, SV10 and SV14 have been discarded, the iterative selection process is complete. The subset of the 20 remaining SVs can be allocated using the available ULS antennas ($N_{ant}$=20). For the first epoch (i=1), the IDs associated with these SVs will then form the $N_{ant}$ elements of vector s(i). The GTs of these 20 remaining SVs selected for allocation are illustrated in FIG. 6.

The effectiveness of the proposed selection, s(i), can be confirmed by checking the number of SVs in view when only the 20 SVs of the subset are considered. Thus, FIG. 7 and FIG. 8 show, for the subset of SVs having the positions shown in FIG. 6 the number of SVs in view at each UGP. In particular, FIG. 7 illustrates the situation for a UMA of 20°, while FIG. 8 illustrates the corresponding situation for a UMA of 40°. As shown in FIG. 7, for every user location, at least three SVs are in view from this subset of 20 SVs with a UMA of 20°. Similarly, from FIG. 8, at each UGP, at least one SV is in view with a UMA of 40°. As a consequence, provided that each of the 20 SVs is allocated to a ULS antenna, all the required links specified in Table 2 above are available at the first epoch.

As mentioned above, design objective D5 is to maximize the spatial diversity of the solution at each epoch. It is recognized that the procedure of FIG. 4 may not find the overall maximum of spatial diversity across all possible subsets of SVs (which might be found, for example, by an exhaustive testing analysis of all the possible subsets of $N_{ant}$ SVs). However, the iterative selection method described in relation to FIG. 4 is computationally much more efficient compared to such an exhaustive analysis. Accordingly, the procedure of FIG. 4 can be considered as a practical approximation of this maximisation (and hence will be referred to herein as a maximisation).

Once the subset of SVs selected for allocation is identified, the corresponding ULS sites and the associated ULS antennas are determined. The former, corresponding to the "Identify ULS sites to be used" in FIG. 4, involves the identification, at epochi, of the ULS sites, u(i), from which the antennas are allocated for the selected SVs, s(i). The approach described herein for this identification is organized into two stages.

In the first stage, the elements of s(i) are sorted based on different priority levels. In particular, the smaller the number of ULS sites in view of a given SV, the higher the relevant priority level of that SV. The rationale is that the SVs in view of fewer ULS sites are to be allocated first because of the limited number of options available in the GS for such SVs. If two, or more, SVs are in view from an identical number of ULS sites, the SVs are sorted based on the DD. Specifically, the higher the DD, the higher the relevant priority level. In this case, the rationale is to minimize, ceteris paribus, the DD of each SV (Design Objective D2). Furthermore, if two, or more, SVs are in view of an identical number of ULS sites and also have an identical DD, they are sorted based on the elevation angle with respect to the European Centre Point (ECP, located at 50°10'21"N, 9°9'0"E). In particular, the higher the elevation angle, the higher the relevant priority level—the rationale here being to improve, ceteris paribus, the dissemination performance over Europe.

In the second stage, following a determination of the priority order for the elements of s(i), a ULS site is identified for each SV to be allocated. This allocation is done on an iterative basis, one SV at a time, according to the priority ordering of the SVs. Amongst the available sites in view of a given SV, the site(s) which are in view from the smallest number of SVs (which are still to be allocated) are identified as a priority for allocation. In this case, the rationale is to promote, as much as possible, a balanced use of the ULS network (i.e. to reduce the risk that a given site is not fully utilised for the dissemination). If there is more than one site which has the same smallest number of SVs in view, the site which is closer (Euclidean Distance) to the SV is selected. This latter option leads to reduced propagation losses and, therefore, to an improved Quality of Service (QoS) as the margin for the uplink budget is increased. Note that the maximum number of SVs allocated to a given ULS site is limited to the number of antennas at that site, i.e. to 4, according to the FOC-2 deployment stage.

Once the subset of SVs has been selected for allocation, s(i), and the corresponding ULS sites, u(i), have been selected, the associated ULS antennas, a(i), are determined. This is done by the "Identify ULS antennas to be used" function shown in FIG. 4. In particular, this function identifies, for each site, the ULS antenna to be used for allocation. This is done on an iterative basis where, for each element of s(i), an antenna is determined at the selected ULS site. The procedure is as follows Firstly, possible allocations made at the previous epochs are confirmed. In other words, if a SV to be allocated at a given ULS site was already allocated to the same site at the previous (preceding) epoch, the same antenna is also used at the current epoch. In this case, the rationale is to avoid unnecessary handovers between the antennas of the same ULS site.

Secondly, a free antenna (i.e. one not allocated in the immediately preceding epoch), if available, is used. This is done to promote a balanced antenna activity amongst the different antennas of a given ULS site. In addition, if an antenna is free at the preceding epoch, it may be oriented towards the SV earlier, which can help to reduce the handover time.

Thirdly, if some of the previously allocated SVs need to be disconnected to free an antenna, the SVs with the longest CD are disconnected first. In many cases, the number of SVs to be disconnected will be matched by the number of the remaining SVs which are still to be connected at the ULS site using the vacated antennas. In such a situation, the disconnection ordering is relatively insignificant (but nevertheless this condition allows the algorithm to unambiguously determine how to proceed). However, if (for example), there is only one new SV to allocate, and two currently connected SVs that are non-locked and, therefore, available for disconnection, this condition determines which of the two currently connected SVs is replaced by the new SV (with the other currently connected SV remaining connected). In this latter situation, this condition helps to achieve a uniform distribution for the CDs across the SVs.

Finally, if there is more than one SV with the same CD, the SV which minimises the elevation angle w.r.t. the ECP is disconnected first. This is done to increase, ceteris paribus, the dissemination performance over Europe.

Once the a(i) vector is identified, the allocation A(i)={s(i), u(i), a(i)} is completely determined for epoch i.

After the contact plan has been computed according to the ULSC algorithm described herein, the output data is evaluated to confirm whether the dissemination requirements are actually met and to assess the efficiency of the proposed schedule.

Performance Evaluation

The performance of the approach described herein is evaluated based on a FOC-2 configuration for both the GS and the SS (referred to herein as the baseline scenario). The performance is also compared with that of the reference algorithm assuming the same baseline scenario.

The assessment takes into consideration the availability of the navigation message. In particular, at a given epoch, the navigation message is considered as available for a given SV if, and only if, the DD of the SV does not exceed the NDRR requirement (100 minutes, as per Table 1). It is noted that the DD is calculated from the end of the last contact (irrespective of the duration of the contact). Based on the availability of the navigation message for each SV at a given epoch, three possible, mutually exclusive, states are then identified for the Galileo system at that epoch. These states are defined as follows:

Nominal Condition: if, at that epoch, the navigation message is available for all the SVs; or Degraded Condition: if, at that epoch, the navigation message is not available for only one SV, but is available for all the other SVs; or Unavailable Condition: if, at that epoch, the navigation message is not available for two or more SVs.

The overall availability of the navigation message across the scheduling period is specified by indicating the fraction of epochs when the system is in a Nominal Condition, plus the fractions of epochs when the system is in either a Degraded Condition or is Unavailable. These fractions are then compared with the corresponding availability requirements for the navigation message (which are still under consolidation). However, for performance evaluation purposes, the specifications indicated in Table 3 below are used as preliminary requirements, and it is verified a-posteriori (after the uplink schedule has been developed, as per the procedure of FIG. 4), that the contact plan does satisfy these requirements.

TABLE 18

Preliminary Requirements for the Navigation Message Availability

| Requirement ID | Requirement Type | Associated Service | Requirement Description |
|---|---|---|---|
| N3 | NDRR | All | The probability that, w.r.t. the navigation message availability, the system is not in "Nominal Condition" shall be less than (or equal to) $10^{-4}$. |
| N4 | NDRR | All | The probability that, w.r.t. the navigation message availability, the system is in "Degraded Condition" shall be less than (or equal to) $5 \cdot 10^{-1}$. |
| N5 | NDRR | All | The probability that, w.r.t. the navigation message availability, the system is "Unavailable" shall be less than (or equal to) $5 \cdot 10^{-1}$. |

It is noted that for the approach described herein, the contact plan computation process is driven by the requirements indicated in Table 1 above. In particular, if the requirement "N1" (from Table 1) is satisfied, and therefore the gap duration between two subsequent contacts is always below the NDRR specification of 100 minutes, then the navigation message is always available from each SV, and hence all the requirements indicated in Table 3 are also met.

Numerical Results

Numerical results are presented in this section to provide specific information on the dissemination performance of the approach described herein for the baseline scenario, and this performance is then compared with that of the reference algorithm (for the same baseline scenario).

The baseline scenario assumes a FOC-2 configuration for both the GS and the SS. The ULS network includes five ULS sites (i.e. Svalbard, Kourou, Papeete, Reunion and Noumea), with four antennas per site. The SS consists of 24 nominal SVs, which are deployed according to a Walker 24/3/1 constellation. As $N_{ant}=20 < N_{SV}=24$, a maximum of 20 SVs can be allocated at each epoch. For this scenario, the approach described herein is used to compute the contact plan over ten sidereal days (i.e. 14,360 minutes) using a time-step of 60 s-hence, $N_e=14,360$ epochs are considered for the full contact plan.

FIG. 9 and FIG. 10 present an example of the schedule computed by the approach described herein, namely the contact plan for the Svalbard ULS site. In particular, FIG. 9 depicts the whole contact plan (for all 24 satellites over a period of 14,360 minutes), while FIG. 10 illustrates a zoom over the first ten hours of this schedule. In these figures, the activity of each of the four antennas is represented using a different colour (blue, red, cyan and green). The contact plan takes into account the fact that a one minute disconnection gap is required for each handover.

Similar figures can be produced for all of the other ULS sites, thus effectively representing the contact plan for each site, together with the activity of each antenna. In particular, it can be shown that the activity of all the 20 ULS antennas is between 97.00% and 99.12%. Accordingly, with the approach described herein, the available GS resources are used efficiently. This, in turn, reflects the number of SVs which are allocated at each epoch. The relevant distribution is shown in FIG. 11, and the average number (19.7247) is very close to the maximum number of SVs ($N_{ant}$=20) which can be allocated at each epoch. In particular, a subset of 20 SVs is allocated for more than 88% of the time, while a subset of 19 SVs is allocated for more than 8% of the time (FIG. 11).

Figure 12:
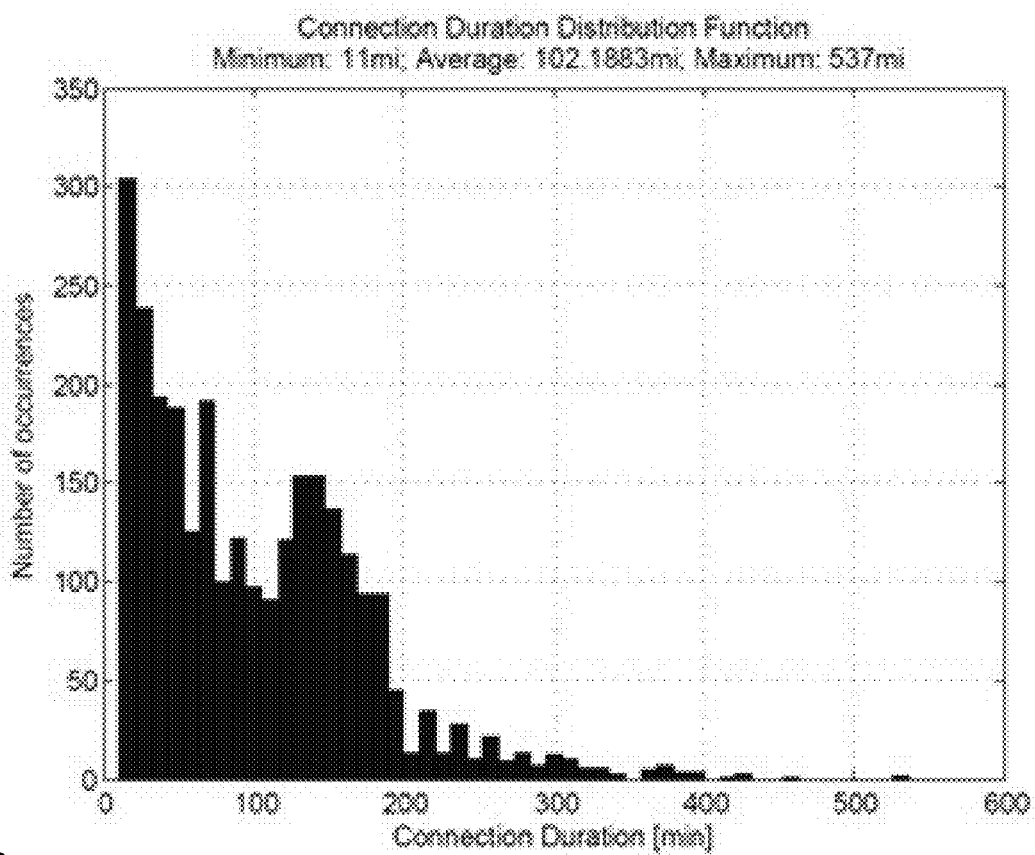
FIG. 12 is a plot illustrating an example of the distribution function of the Contact Duration (CD) determined using the approach described herein.

FIG. 12 is a plot illustrating an example of the cumulative distribution function of the contact duration (CD) determined using the approach described herein. The minimum observed duration of each contact is 11 minutes, which is compliant with the MCD requirement (N2) of 10 minutes from Table 1.

FIG. 13 is a plot illustrating an example of the cumulative distribution function of the disconnection duration (DD) determined using the approach described herein. The maximum DD is 76 minutes, which is compliant with the NDRR requirement (N1) of 100 minutes from Table 1. Therefore, the navigation message is always available for all the SVs. As a consequence, the system is in the Nominal Condition for each epoch, and therefore the requirements indicated in Table 3 above are satisfied.

Figure 14:
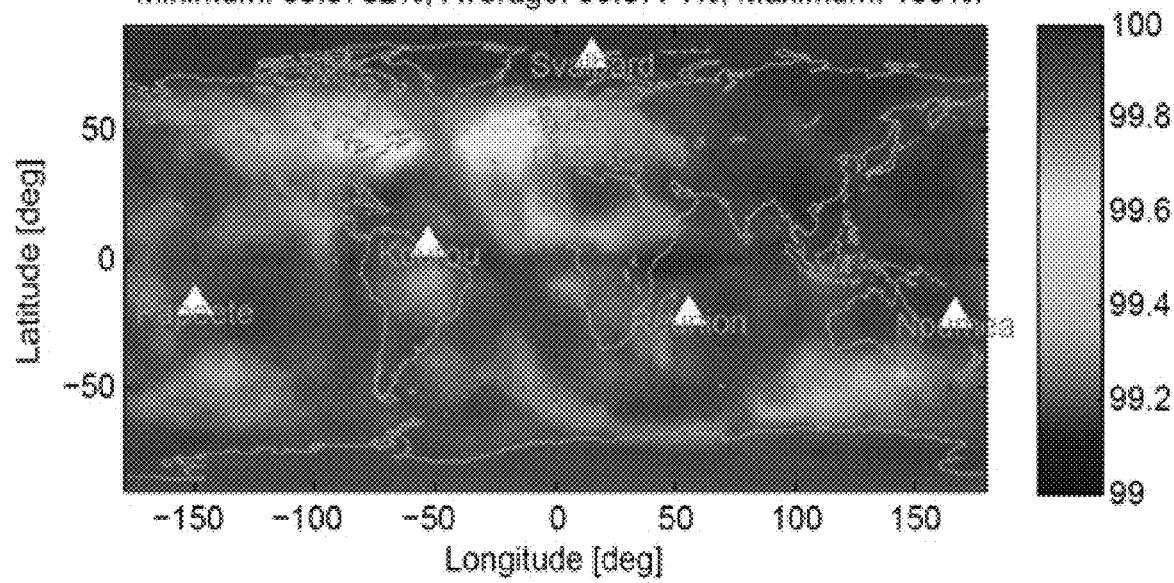
FIG. 14 is a plot illustrating an example, for a contact plan determined using the approach described herein, of the percentage of time with at least two connected SVs in view at an elevation of 20° or more.

FIG. 14 is a plot illustrating an example, for a contact plan determined using the approach described herein, of the percentage of time with at least two connected SVs in view, at an elevation of 20° or more. The minimum value is 99.58%, which is compliant with the corresponding LA requirement (CS1) of 99% (see Table 1).

Figure 15:
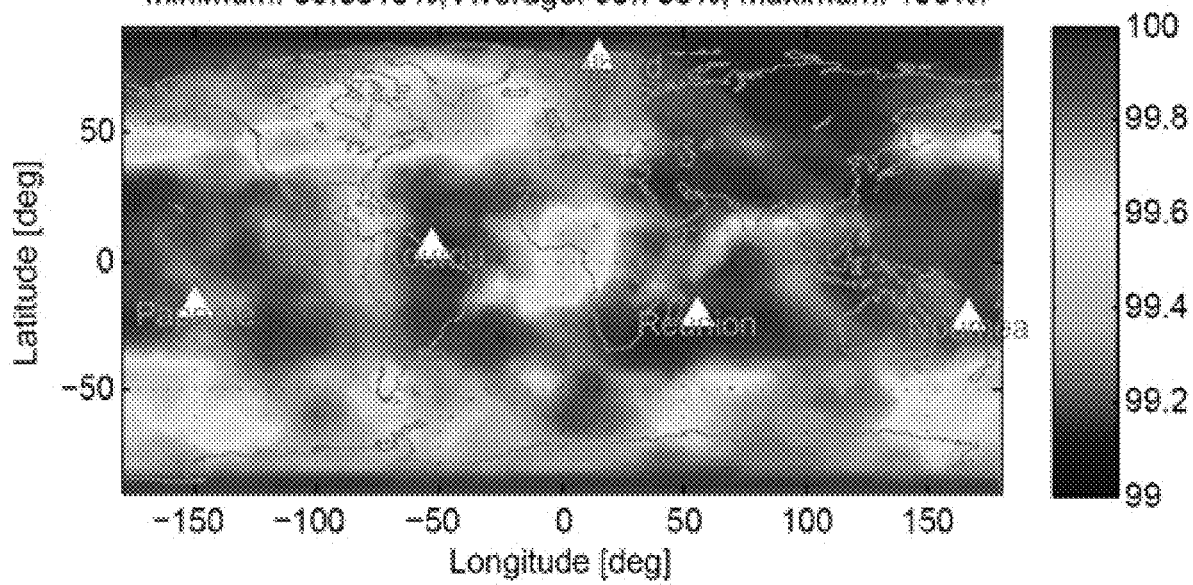
FIG. 15 is a plot illustrating an example, for a contact plan determined using the approach described herein, of the percentage of time with at least one connected SV in view at an elevation of 40° or more.

Similarly, FIG. 15 is a plot illustrating an example, for a contact plan determined using the approach described herein, of the percentage of time with at least two connected SVs in view, at an elevation of 40° or more. The minimum value is 99.33%, which again is compliant with the associated LA requirement (CS2) of 99% (see Table 1).

Finally, FIG. 16 is a plot illustrating an example, for a contact plan determined using the approach described herein, of the percentage of time with at least two connected SVs in view, at an elevation of 5° or more. The minimum value is 99.95%, which is again compliant with the associated LA requirement (SAM) of 99% (see Table 1).

In summary, the contact plan computed using the approach described herein is fully compliant with the dissemination requirements listed in Table 1, including the LA specifications for the provision of both CS and SAR.

Performance Comparison

The performance of the new ULSC algorithm has been compared with that of the reference algorithm. This has been investigated by using a MATLAB emulator developed by Thales Alenia Space—France (TAS-F). In order to avoid convergence problems, none of the LA requirements indicated in Table 2 is considered by the reference algorithm in the contact plan computation process. The comparison deals with all the dissemination requirements indicated in Table 1 and is complemented by availability figures for the navigation messages. Finally, some considerations about performance in terms of antenna activity are also given.

Regarding the MCD requirement, CD statistics produced from this comparison are presented in Table 4 below. Using the new ULSC algorithm, the MCD requirement is explicitly considered, for each contact, in the schedule computation. As a result, the minimum duration of each contact is actually 11 minutes (see Table 4). This value is compliant with the MCD specification of 10 minutes (see Table 1). In contrast, the reference algorithm only ensures that there is at least one contact of at least 10 minutes (a configurable value) for each SV every day. As the MCD requirement is not considered for every contact, the resulting schedule for the reference algorithm includes a number of contacts whose duration is between 1 minute (the minimum duration of a contact, see Table 4) and 10 minutes.

TABLE 19

CD Statistics for the new algorithm described herein compared to the reference algorithm (all timings are in minutes)

| | Connection Duration | | | |
| --- | --- | --- | --- | --- |
| Algorithm | Min. [mi] | Avg. [mi] | Max. [mi] | MCD Req. [mi] |
| New | 11.00 | 102.18 | 537.00 | 10 |
| Reference | 1.00 | 189.15 | 659.00 | 10 |
| Delta (New − Reference) | 10.00 | −86.97 | −122.00 | ≥0 |

Compared to the reference algorithm, the approach described herein is shown to promote a more uniform distribution for the duration of each contact. Both the average and the maximum value of the CD statistics are reduced (see Table 4). This strategy helps in the verification of the remaining dissemination requirements, as more alternatives can be used to improve the spatial diversity of the solution.

Regarding the NDRR requirement, DD statistics are reported in Table 5 below. Both the approach described herein and the reference ULSC algorithm are able to effectively consider the NDRR requirement in the contact plan computation process. Therefore, the NDRR specification of 100 minutes (see Table 1) is met by both the schemes (see Table 5).

TABLE 20

DD Statistics for the new algorithm described herein compared to the reference algorithm (all timings are in minutes)

| | Disconnection Duration | | | |
| --- | --- | --- | --- | --- |
| Algorithm | Min. [mi] | Avg. [mi] | Max. [mi] | NDRR Req. [mi] |
| New | 1.00 | 22.28 | 76.00 | 100.00 |
| Reference | 1.00 | 47.29 | 96.00 | 100.00 |
| Delta (New − Reference) | 0.00 | −25.01 | −20.00 | ≤0 |

It is noted that, compared to the reference algorithm, the approach described herein exhibits much lower values for both the average and the maximum values of the DD statistics (see Table 5). In other terms, the approach described herein tends to avoid critical situations where the DD of a SV "gets too close" to the NDRR specification. This reduces the "age" of the navigation data which is broadcast by the SV and therefore has a positive impact on the expected performance at the user receiver.

With regard to Navigation Message Availability, these figures are reported in Table 6 below, and include the fraction of times when the system is either in "Nominal Condition", or in "Degraded Condition", or is completely "Unavailable" (as defined in the "PERFORMANCE EVALUATION" section of this document). Because both the new and the reference ULSC algorithms are able to meet the NDRR requirement, the navigation message is always available (sufficiently up-to-date) for each SV in the constellation. In other words, the system is always in a Nominal Condition, thus satisfying the preliminary requirements for navigation message availability (see Table 3 above).

TABLE 21

Navigation Message Availability for the new algorithm described herein compared to the reference algorithm

| | Navigation Message Availability | | | | | |
|---|---|---|---|---|---|---|
| Algorithm | Nom. Cond. | Req. | Degr. Cond. | Req. | Syst. Unav. | Req. |
| New | 1.00000 | 0.99990 | 0.00000 | 5.E−05 | 0.00000 | 5.E−05 |
| Reference | 1.00000 | 0.99990 | 0.00000 | 5.E−05 | 0.00000 | 5.E−05 |
| Delta (New − Reference) | 0.00000 | ≥0 | 0.00000 | ≤0 | 0.00000 | ≤0 |

In terms of the Link Availability requirements, three different levels of compliance have been introduced for these specifications (as defined in Table 2 above). In particular:

4. If the minimum availability (i.e. the availability at the Worst User Location, WUL, amongst all the UGPs) is compliant with (i.e. larger than or equal to) the specification, the requirement is considered to be "fully" verified;
5. If only the average availability (i.e. the average value of the availability over all the UGPs) is compliant, the requirement is considered to be only "partially" verified; and, finally,
6. If even the average availability is not compliant, the requirement is considered as "not verified."

The CS1 requirement (see Table 2) calls for a worldwide availability of 99% for at least two connected SVs in view, at a minimum elevation angle of 20°. The statistics for the corresponding availability figures, obtained with both the new and the reference ULSC algorithms, are reported in Table 7 below. Compared to the reference algorithm, the contact plan computed by the approach described herein increases the minimum availability of 2.34%. As a result, the CS1 requirement is fully verified (satisfied) by the new algorithm and it is only partially verified by the reference algorithm.

TABLE 22

Percentage of Time with at least two connected SVs in view (UMA: 20°) for the new algorithm described herein compared to the reference algorithm

| | At least two connected SVs in view (UMA: 20°) | | | |
|---|---|---|---|---|
| Algorithm | Min. [%] | Avg. [%] | Max. [%] | Req. [%] |
| New | 99.58 | 99.88 | 100.00 | 99.00 |
| Reference | 97.24 | 99.84 | 100.00 | 99.00 |
| Delta (New − Reference) | 2.34 | 0.04 | 0.00 | ≥0 |

The CS2 requirement (see Table 2) calls for a worldwide availability of 99% of at least one connected SV, at a minimum elevation angle of 40°. As mentioned above, the large UMA value (40°) is responsible for a significant reduction of the coverage area of a single SV, which is just 12% of the surface of the Earth. In this situation, the strategy used by the new ULSC algorithm described herein to improve the spatial diversity of the solution provides a significant benefit in helping to meet the LA requirement. In particular, the statistics for the corresponding availability figures, obtained with both the new and the reference ULSC algorithms, are reported in Table 8 below. Compared to the reference algorithm, the schedule computed by the approach described herein increases both the minimum and the average availability. This improvement is up to 7.46% for the minimum availability. As a result, the CS2 requirement is fully met by the new algorithm, while it is not (even partially) verified by the reference algorithm.

TABLE 23

Percentage of Time with at least one connected SV in view (UMA: 40°) for the new algorithm described herein compared to the reference algorithm

| | At least one connected SV in view (UMA: 40°) | | | |
|---|---|---|---|---|
| Algorithm | Min. [%] | Avg. [%] | Max. [%] | Req. [%] |
| New | 99.33 | 99.80 | 100.00 | 99.00 |
| Reference | 91.87 | 97.92 | 100.00 | 99.00 |
| Delta (New − Reference) | 7.46 | 1.88 | 0.00 | ≥0 |

The last LA specification is the SAR1 requirement (see Table 2). This calls for a worldwide availability of 99% of at least two connected SVs, at a minimum elevation angle of 5°. The statistics for the corresponding availability figures, obtained with both the new and the reference ULSC algorithms, are reported in Table 9, see below. Compared to the reference algorithm, the approach described herein results in a very minor degradation (0.04%) for the minimum availability. However, this degradation is not significant for practical purposes, since both the algorithms are still fully compliant with the SAR1 requirement.

TABLE 24

Percentage of Time with at least two connected SVs in view (UMA: 5°) for the new algorithm described herein compared to the reference algorithm

| | At least two connected SVs in view (UMA: 5°) | | | |
|---|---|---|---|---|
| Algorithm | Min. [%] | Avg. [%] | Max. [%] | Req. [%] |
| New | 99.95 | 99.99 | 100.00 | 99.00 |
| Reference | 99.99 | 100.00 | 100.00 | 99.00 |
| Delta (New − Reference) | −0.04 | −0.01 | 0.00 | >0 |

Finally, the statistics relevant to the antenna activity are reported in Table 10 below for both the approach described herein and the reference ULSC algorithm. Compared to the reference algorithm, the approach described herein increases the percentage of time when the ULS antennas are used. In particular, an increase of 5% is observed for the minimum percentage of antenna usage. Therefore, the approach described herein results in a more efficient use of the available GS resources. This increase in efficiency helps to support the verification of the five dissemination requirements indicated in Table 1.

TABLE 25

Antenna Activity for the new algorithm described herein compared to the reference algorithm

| | Antenna Activity | | |
|---|---|---|---|
| Algorithm | Min. [%] | Avg. [%] | Max. [%] |
| New | 97.00 | 98.62 | 99.12 |
| Reference | 92.00 | 96.25 | 98.00 |
| Delta (New − Reference) | 5.00 | 2.37 | 1.12 |

Computing a contact plan using the approach described herein provides (at least) two significant benefits:
3. The union of the coverage areas of the allocated SVs ("spatial diversity") is maximised at each epoch; and
4. The overall number of handovers is minimised.

Both these aspects help to improve the LA performance. In particular, the maximisation of spatial diversity is beneficial in a case of limited GS resources (e.g. when the number of uplink antennas is smaller than the number of SVs in the constellation). In addition, the removal of unnecessary handovers minimises the number of disconnection gaps required to re-orient the uplink antenna and to acquire a new SV. These features may provide significant benefits when the new ULSC algorithm is used in other satellite communication systems, as discussed in the next section.

Applications to Other Satellite Communication Systems

The approach described herein may also be utilised for other satellite communication systems, especially those where the relevant constellation includes a large number (e.g. several hundreds or even thousands) of SVs (often referred to as a "Mega-constellation"). In order to investigate possible benefits of the present approach in such a Mega-constellation, the performance of this approach has been evaluated using an example derived from the "One-Web" initiative (http://oneweb.world/), which represents a typical Mega-constellation.

In particular, the Mega-constellation studied in conjunction with the present approach includes 720 SVs, which are assumed to be uniformly distributed amongst 18 orbital planes (i.e. 40 SVs for each orbital plane). All of the orbits are assumed to be circular (zero eccentricity) and almost polar (with an inclination angle of 87.9°). Furthermore, an orbital radius of 7,626.308 km is selected. This leads to an orbital period of 6,628 seconds (110.47 minutes), which is exactly $1/13^{th}$ of the duration of a sidereal day (23 hours, 56 minutes, and 4 seconds). As a result, one sidereal day is also the ground track repetition period of the Mega-constellation under analysis.

Such a Mega-constellation is shown in FIG. 17, and the relevant parameters for the Mega-constellation are also presented in Table 11 below. The constellation is arranged to ensure global coverage: assuming a UMA of 37° (or below), each user on the Earth surface is always in view of at least one SV.

TABLE 26

The Mega-constellation used to evaluate the performance of the ULSC algorithm described herein
Mega-constellation under study

| | |
|---|---|
| Number of SVs | 720 |
| Number of Orbital Planes | 18 (40 SVs per Orbital Plane) |
| Inclination Angle | 87.9° |
| Eccentricity | 0° (Circular Orbit) |
| Orbital Altitude | 1,255.308 km |
| Orbital Radius | 7,626.308 km |
| Orbital Period | 6,628 s (=110.47 mi) |
| Ground Track Repetition Period | One sidereal day (23 h 56 mi 4 s) |

The Mega-constellation under study is assumed to be supported by a network of 64 ground stations ("Gateways," GWs) which act as traffic gateways between the terrestrial networks and the SVs. The locations of the GWs are indicated in Table 12. Assuming a masking angle of 10° at each site, it can be shown that each GW is always in view for at least 18 SVs.

TABLE 27

The network of GWs supporting the Mega-constellation under study

| Location | Country | Lat. | Long. |
|---|---|---|---|
| Troll | Norway | −71.67 | −2.84 |
| Mawson | Australia | −67.60 | 62.87 |
| Casey Station | Australia | −66.28 | 110.53 |
| Leningradskaya Station | Russia | −69.50 | 159.38 |
| Russkaya Station | Russia | −74.77 | −136.87 |
| Juan Carlos I | Spain | −62.66 | −60.39 |
| Cape Town | South Africa | −33.93 | 18.42 |
| Bata | Equatorial Guinea | 1.85 | 9.75 |
| Ile Amsterdam | France | −37.83 | 77.55 |
| New Norcia | Australia | −31.80 | 115.89 |
| Adelaide | Australia | −34.93 | 138.60 |
| Auckland | New Zealand | −36.84 | 174.74 |
| Chatam Islands | New Zealand | −44.03 | −176.43 |
| Hanga Roa | Chile | −27.13 | −109.42 |
| Santiago of Chile | Chile | −33.15 | −70.67 |
| Grytviken | UK | −54.28 | −36.51 |
| Edinburgh of the Seven Seas | UK | −37.07 | −12.32 |
| Saint Helena | UK | −15.93 | −5.72 |
| Malindi | Kenya | −2.93 | 40.22 |
| Reunion | France | −21.22 | 55.57 |
| Diego | UK | −7.27 | 72.37 |
| Jakarta | Indonesia | −6.20 | 106.82 |
| Aitape | Papua New Guinea | −3.13 | 142.35 |
| Noumea | France | −22.27 | 166.41 |
| Wallis et Futuna | France | −13.27 | −176.18 |
| Papeete | France | −17.58 | −149.62 |
| Puerto Villamil | Ecuador | −0.96 | −90.97 |
| Lima | Perù | −12.04 | −77.03 |
| Natal | Brasil | −5.79 | −35.20 |
| Ascension Island | UK | −7.95 | −14.41 |
| Madama | Niger | 21.95 | 13.65 |
| Khartoum | Sudan | 15.63 | 32.53 |
| Dubai | UAE | 24.95 | 55.33 |
| Trivandrum | India | 8.29 | 76.57 |
| Bangkok | Thailand | 13.75 | 100.47 |
| Manila | Philippines | 14.58 | 121.00 |
| Palikir | Micronesia | 6.92 | 158.16 |
| Honolulu | US | 21.30 | −157.82 |
| Cabo San Lucas | Mexico | 22.89 | −109.92 |
| Cockburn Harbour | UK | 21.48 | −71.53 |
| Curacao | Netherlands | 12.12 | −69.00 |
| Kourou | France | 5.08 | −52.63 |
| Dakar | Senegal | 14.69 | −17.45 |
| Redu | Belgium | 50.00 | 5.15 |
| Ankara | Turkey | 39.93 | 32.87 |
| Samarkand | Uzbekistan | 39.70 | 66.98 |
| Jiuquan | China | 39.77 | 98.57 |
| Nemuro | Japan | 43.33 | 145.58 |
| Adak | US | 51.88 | −176.65 |
| Anchorage | US | 61.22 | −149.90 |
| Vancouver | Canada | 49.26 | −123.14 |
| Thunder Bay | Canada | 48.38 | −89.25 |
| St Pierre and Miquelon | France | 46.50 | −56.20 |
| Vila do Porto | Portugal | 36.97 | −25.16 |
| Jan Mayen | Norway | 70.98 | −8.53 |
| Saranpaul | Russia | 64.26 | 60.91 |
| Botulu | Russia | 64.14 | 119.77 |
| Wales | US | 65.61 | −168.09 |
| San Diego | US | 32.72 | −117.16 |
| Nuuk | Denmark | 64.18 | −51.74 |
| Svalbard | Norway | 78.22 | 15.65 |
| Masuda | Japan | 30.55 | 131.02 |
| Hartebeeshoek | South Africa | −25.89 | 27.71 |
| Montevideo | Uruguay | −34.88 | −56.18 |

For this network of GWs, a Depth of Coverage (DOC) analysis is shown in FIG. 18. The DOC value indicates the number of GWs in view of a SV over-flying a specific point on the Earth's surface. According to FIG. 18, a SV is, on average, in view of at least three GWs, although there are certain areas with a zero DOC value—these are located over the Pacific Ocean, where no land masses are available for the deployment of possible GWs. When a SV is flying-over one of these areas with DOC=0 ("zero DOC value areas"), no GWs are in view. In such conditions, no allocation is possible for that SV.

For the Mega-constellation (and set of GWs) defined above, the performance of the ULSC algorithm described herein is evaluated based on:
3. The percentage of time when a user is in view of at least two connected SVs, at a minimum elevation angle of 37°; and
4. The percentage of time when a user is in view of at least one connected SV, at a minimum elevation angle of 37°.

Being in view of at least two connected SVs provides a certain level of redundancy in case one of the links is not available, e.g. because of severe rain attenuation.

Overall, four cases are considered, based on the possible combinations of:
3. Two GS configurations, with a different number of antennas for each of the 64 GWs; and
4. Two different modes (i.e. "nominal" and "degraded" conditions) for the GS. In particular:
Either 12 or 18 antennas are considered for each GW. It is noted that 12 antennas is the minimum number of antennas required in principle at each site to allow for permanent allocation, since $N_{ant}=64\times 12=768>720=N_{SV}$ (subject to the geographical distribution of the GWs). In contrast, 18 antennas reflects the minimum number of SVs in view at each of the 64 sites GW for a masking angle of 10°.

In nominal conditions, none of the 64 GWs is affected by a failure. In contrast, in degraded conditions, up to five contiguous GWs (Dakar, Madama, Redu, Jan Mayen and Svalbard) are assumed to have failed simultaneously. These GWs are located in the northern hemisphere and are all close to the Greenwich meridian (see Table 12). It is noted that, if 12 antennas per GW are used, the failure of five GWs leads to the loss of 60 antennas, in which case the overall number of antennas is below the number of SVs in the constellation (as $N_{ant}=(64-5)\times 12=59\times 12=708<720=N_{SV}$).

For the four configurations under investigation, the performance of the new ULSC algorithm is compared with that of a "reference" algorithm. In this case, the reference algorithm is a standard scheme in which each SV is allocated to the closest (Euclidean distance) GW in view, as long as uplink antennas are still available at that GW (rather than the ULSC algorithm implemented at the Galileo MUCF as previously).

Information on the performance of the new algorithm described herein is presented in Table 13, while Table 14 presents corresponding performance information for the reference algorithm. A comparison between the performance of these two different approaches is provided in Table 15. This presents in particular the difference in link availability between the approach described herein and the reference algorithm. In other words, the figures in Table 15 are derived by subtracting the performance figures in Table 14 for the reference algorithm from the corresponding figures in Table 13 for the approach described herein. It can be seen from Table 15 that the approach described herein improves the performance (in terms of link availability) compared with the reference algorithm for all four configurations.

TABLE 28

Performance of the new ULSC algorithm for the Mega-constellation under study

| | | | | | New ULSC Algorithm | | | | | |
|---|---|---|---|---|---|---|---|---|---|---|
| | | | | | At least 2 conn. SVs (UMA: 37°) | | | At least 1 conn. SV (UMA: 37°) | | |
| Cfg. ID | No. of GWs | No. of Antennas per GW | Overall No. of Antennas | Mode | Min [%] | Avg [%] | Max [%] | Min [%] | Avg [%] | Max [%] |
| 1 | 64 | 12 | 768 | Nominal | 36.04 | 98.13 | 100.00 | 90.99 | 99.70 | 100.00 |
| 2 | 59 | 12 | 708 | Degraded | 36.94 | 97.64 | 100.00 | 90.09 | 99.62 | 100.00 |
| 3 | 64 | 18 | 1152 | Nominal | 52.25 | 99.40 | 100.00 | 90.99 | 99.96 | 100.00 |
| 4 | 59 | 18 | 1062 | Degraded | 52.25 | 99.41 | 100.00 | 90.99 | 99.96 | 100.00 |

TABLE 29

Performance of the reference ULSC algorithm for the Mega-constellation under study

| | | | | | Reference ULSC Algorithm | | | | | |
|---|---|---|---|---|---|---|---|---|---|---|
| | | | | | At least 2 conn. SVs (UMA: 37°) | | | At least 1 conn. SV (UMA: 37°) | | |
| Cfg. ID | No. of GWs | No. of Antennas per GW | Overall No. of Antennas | Mode | Min [%] | Avg [%] | Max [%] | Min [%] | Avg [%] | Max [%] |
| 1 | 64 | 12 | 768 | Nominal | 0.00 | 97.39 | 100.00 | 8.11 | 99.30 | 100.00 |
| 2 | 59 | 12 | 708 | Degraded | 0.00 | 92.22 | 100.00 | 3.60 | 97.06 | 100.00 |
| 3 | 64 | 18 | 1152 | Nominal | 14.41 | 98.98 | 100.00 | 71.17 | 99.85 | 100.00 |
| 4 | 59 | 18 | 1062 | Degraded | 14.41 | 98.97 | 100.00 | 71.17 | 99.86 | 100.00 |

TABLE 30

Performance comparison between the new and the reference ULSC algorithms for the Mega-constellation under study

| | | | | | Δ (New-Reference) | | | | | |
|---|---|---|---|---|---|---|---|---|---|---|
| | | | | | At least 2 conn. SVs (UMA: 37°) | | | At least 1 conn. SV (UMA: 37°) | | |
| Cfg. ID | No. of GWs | No. of Antennas per GW | Overall No. of Antennas | Mode | Min [%] | Avg [%] | Max [%] | Min [%] | Avg [%] | Max [%] |
| 1 | 64 | 12 | 768 | Nominal | 36.04 | 0.73 | 0.00 | 82.88 | 0.40 | 0.00 |
| 2 | 59 | 12 | 708 | Degraded | 36.94 | 5.41 | 0.00 | 86.49 | 2.56 | 0.00 |
| 3 | 64 | 18 | 1152 | Nominal | 37.84 | 0.42 | 0.00 | 19.82 | 0.11 | 0.00 |
| 4 | 59 | 18 | 1062 | Degraded | 37.84 | 0.44 | 0.00 | 19.82 | 0.10 | 0.00 |

Each of the four cases under study (i.e. in accordance with the number of antennas per GW and the condition/mode of the GW network) is labelled with a Configuration ID (1, 2, 3, and 4), as indicated in the first column of Table 13, Table 14 and Table 15. For the case of Configuration ID=1, there are 64 available GWs (nominal conditions) and 12 antennas per GW; for the case of Configuration ID=2, there are 59 available GWs (degraded conditions) and 12 antennas per GW; for the case of Configuration ID=3, there are 64 available GWs (nominal conditions) and 18 antennas per GW; and for the case of Configuration ID=4, there are 59 available GWs (degraded conditions) and 18 antennas per GW.

FIG. 19 is a plot illustrating, for a contact plan determined for configuration ID=1 using the approach described herein, an example of the percentage of time that a given location has at least two connected SVs in view at an elevation of 37° or more. The minimum value is 36.04%, while the average value is 98.13%. As expected, the worst performance is observed over the Pacific Ocean, where SVs flying-over zero DOC value areas (FIG. 18) cannot be allocated (and so cannot be in a connected state).

For the same configuration (ID 1, 64 GWs, 12 antennas per GW), FIG. 20 is an analogous plot illustrating, for a contact plan determined using the reference algorithm, an example of the percentage of time that a given location has at least two connected SVs in view at an elevation of 37° or more. In this case, the minimum value drops to 0%, while the average value is 97.39%. Again, the worst performance is observed over the Southern part of the Pacific Ocean, where a user is not in view of any connected SV (FIG. 19) for the whole duration of the contact plan.

It will be appreciated that areas with a zero DOC value (as shown in FIG. 18) result in a performance degradation in terms of LA. Such a degradation is observed for both the new and the reference ULSC algorithms. However, the (negative) effects of these zero DOC value a reason the dissemination performance are significantly mitigated by the new ULSC algorithm (see FIG. 19), where the spatial diversity of the allocation is maximised at each epoch, compared with the effects that are observed when using the reference algorithm (see FIG. 20).

FIG. 21 and FIG. 22 illustrate the dissemination performance obtained with the new and the reference algorithm, respectively, in degraded conditions in which five contiguous GWs (Dakar, Madama, Redu, Jan Mayen and Svalbard) are assumed to be simultaneously failed. These five GWs are indicated in both FIG. 19 and FIG. 20 using two white circles (and the relevant GWs are then omitted from FIGS. 21 and 22). More particularly, FIG. 21 illustrates the situation for the configuration ID=2, with 59 GWs (degraded conditions) and 12 antennas per site, and for a contact plan determined using the approach described herein, and shows the percentage of time with at least two connected SVs in view at a given location at an elevation of 37° or more. The minimum value of this percentage is 36.94%, while the average value is 97.64%. These values are almost identical to those obtained in nominal conditions, namely 36.04% and 97.39%, respectively, as per the plot of FIG. 19.

For the same configuration (ID 2, 59 GWs, 12 antennas per GW), FIG. 22 is a plot illustrating, for a contact plan determined using the reference algorithm, the percentage of time with at least two connected SVs in view from a given location at an elevation of 37° or more. Compared to nominal conditions as shown in FIG. 20, a decrease of more than 5% (i.e. from 97.39% to 92.22%) is observed for the average value. This decrease is mainly due to a significant performance degradation over the Arctic region and the Greenwich meridian, i.e. where the failed GWs are located. Such a degradation is not observed when the contact plan is computed by the new ULSC algorithm presented herein, as shown in FIG. 21.

Indeed, with reference to Table 15, in the specific case of configuration ID 2, indicating 59 GWs (degraded conditions) and 12 antennas per GW, the increase in the minimum value of the percentage of time when a user at any given location is in view of at least two connected SVs is 36.94%. Such an improvement can be also noted by comparing FIG. 21 and FIG. 22, respectively. A larger increase (86.49%) is also observed for the minimum value of the percentage of time when a user at any given location is in view of at least one connected SV (Table 15).

The above results demonstrate that the new ULSC algorithm provides increased robustness against possible failures in the GS infrastructure compared with the reference algorithm. Even if multiple, contiguous, GWs are simultaneously lost (as for Configuration IDs 2 and 4), the effect on the dissemination performance is significantly mitigated by adopting the approach described herein. Again, it is believed that this mitigation can be attributed to maximising, at each epoch, the spatial diversity of the allocation.

The results presented in Table 13 and Table 14 above suggest that a similar level of dissemination performance can be obtained either by:

Using the reference ULSC algorithm and a GS configuration with 18 antennas per GW (Configuration IDs 3 and 4 of Table 14); or Using the new ULSC algorithm and a GS configuration with only 12 antennas per GW (Configuration IDs 1 and 2 of Table 13).

This indicates that by adopting the approach described herein, it may be possible to save up to 64×(18-12)=64× 6=384 uplink antennas (for the particular Mega-constellation of Table 12). If we assume (as a preliminary estimation) an overall cost of 172,000 US Dollars (USD) for each antenna (including procurement, installation and maintenance and operating costs for an operational life of six years), this change in scheduling algorithm could potentially lead to a cost reduction of more than 66 Million USD (i.e. 172,000×384=66,048,000 USD).

Conclusions

A new approach has been described herein for performing uplink scheduling (ULSC) for satellite constellations, such as for satellite navigation (e.g. Galileo) and communication (e.g. Mega-constellation) systems. In this approach, the contact plan computation process maybe driven by different types of specifications, such as:

4. A Minimum Contact Duration (MCD), which sets a minimum duration for each contact;
5. A Navigation Data Refresh Rate (NDRR), which sets a maximum time interval between successive contacts with a given satellite (for refreshing navigation data in the case of Galileo, or any other desired data in the case of other satellite systems); and
6. Link Availability (LA) requirements, which are typically expressed in terms of a minimum number of connected satellites visible at any given location, with a minimum elevation angle.

In this context, a connected satellite is one that has a current link to a ground station antenna. Such a link may be used for communications, via the satellite, between a ground station and a user. The approach described herein utilises a maximisation process for spatial diversity to enhance link availability. Possible MCD and NDRR requirements are also considered in this process.

The performance of the new ULSC approach described herein has been evaluated based on the FOC-2 deployment stage for the Galileo system. This includes:

c. A ULS Network with five ULS sites and four antennas per site; and
d. 24 SVs in the SS, which are deployed in a Walker 24/3/1 constellation.

The analysis has assumed nominal conditions, i.e. no failure for any of the elements of both the Ground Segment (GS) and the Space Segment (SS). The performance of the new ULSC approach has also been compared with that of the ULSC algorithm currently implemented at the Galileo Mission and Uplink Control Facility (MUCF), which is considered as a reference.

Numerical results have shown that the new approach is able to meet all of the dissemination requirements (in terms of MCD, NDRR and LA, as mentioned above). In contrast, the LA requirements for the Galileo commercial service (CS) are not met by the reference algorithm. For example, with the schedule computed by the new approach, the availability of links for the provision of CS is significantly improved (by up to 7%). In addition, compared to the reference algorithm, both the average and maximum values of the Disconnect Duration (DD) are significantly reduced using the new approach (the average DD value is reduced by 25 minutes). Consequently, the age of the navigation data broadcast by the different SVs is also reduced. This, in turn, has a positive impact on the expected performance at the user receivers. Furthermore, for the approach described herein, the ground station resources may be more efficiently used. In some simulations, an analysis of antenna activity indicates that, compared to the reference algorithm, the percentage of time when the uplink station (ULS) antennas are used is increased by up to 5% for the approach described herein.

The approach described herein can be easily adapted to include many of the new concepts which are currently under study in the framework of the "Galileo $2^{nd}$ Generation" (G2G) activities. For example, in one option under investigation, a set of Inclined Geo-Synchronous Orbit (IGSO) SVs will be deployed for navigation message broadcasting, thus complementing the planned constellation of Medium Earth Orbit (MEO) SVs. Compared with MEO SVs, IGSO SVs have a much larger coverage area. Consequently, in the scheduling approach described herein, such IGSO SVs could be allocated with a higher level of priority than the MEO SVs, since they contribute more significantly to spatial diversity.

The method described herein is not limited to GNSS systems, but can be applied to any satellite communication system where the number of ground antennas is limited and hence a contact plan for the satellites needs to be carefully scheduled. A typical example is given by Mega-constellation systems, where up to several hundred (or even thousands) of SVs can be deployed in the SS.

For a typical Mega-constellation case, the new ULSC algorithm is shown to provide, compared to a standard allocation method, improved dissemination performance (in terms of LA), together with an increased robustness against possible failures in the GS infrastructure. In one example, a given level of dissemination performance was obtained with a reduced number (one-third less) of uplink antennas. Based on a preliminary estimation, this could potentially lead to a significant reduction (up to several tens of USD millions dollars) in the GS infrastructure deployment costs.

The approach described herein may be implemented using one or more computer programs (software). The software may run on one or more general purpose computers provided with processor(s), whereby the software is loaded from memory into the processor(s) for execution to implement the approach described herein. In some implementations, the software may run, at least in part on special-purpose hardware (e.g. Graphics Processing Units, GPUs). The software may be loaded into memory from a hard disk, flash memory, or other storage device, and/or by a wireless or wired communications link.

The skilled person will appreciate that various embodiments have been described herein by way of example, and that different features from different embodiments can be combined as appropriate. Accordingly, the scope of the presently claimed invention is to be defined by the appended claims and their equivalents.

REFERENCES

[11] European Commission (EC), "Mid-term review of the European satellite radio navigation programmes," Report from the Commission to the European Parliament and the Council, Brussels, BE, COM(2011) 5 final, 18 Jan. 2011.
[12] B. Hofmann-Wellenhof, H. K. Lichtenegger and E. Wasle, "GNSS—Global Navigation Satellite Systems," Springer-Verlag, 2008, Wien, A T.
[13] EC and ESA, "Galileo Mission High Level Definition," 23 Sep. 2002, Brussels, BE.
[14] Y. Long, P. Wang, Z. Zhang, C. Yingwu, "Uplink Task Scheduling Model and Heuristic Algorithm of Satellite Navigation System," Advances in Information Sciences and Service Sciences, Vol. 4, Issue 16, September 2012.

[15] RTCA DO-229D, "Minimum Operational Performance Standards for Global Positioning System/Wide Area Augmentation System Airborne Equipment," Prepared by RTCA SC-159, 13 Dec. 2006, Washington D.C., US.

[16] D. Vallado, "Fundamentals of Astrodynamics and Applications," 4th Ed., Space Technology Library Series, Springer and Microcosm Press, 29 Mar. 2013, US.

[17] D. Vallado, P. Crawford, "SGP4 Orbit Determination," 2008 AIAA/AAS Astrodynamics Specialists Conference, 18-21 Aug. 2008, Honolulu, Hi., US.

[18] EU, "Galileo Open Service Signal-in-Space Interface Control Document," OS SIS ICD, Issue 1.2, November 2015, Brussels, BE.

[19] J. Sanz Subirana, J. M. Juan Zornoza and M. Hernandez-Pajares, "GNSS Data Processing—Volume I: Fundamentals and Algorithms," ESA Communications, TM-23/1, May 2013, Noordwijk, NL.

[20] T. Vincenty, "Direct and Inverse Solutions of Geodesics on the Ellipsoid with Application of Nested Equations," Survey Review (Published by the Directorate of Overseas Surveys of the Ministry of Overseas Development), Vol. 23, No. 176, April 1975, London, UK.

The invention claimed is:

1. A method for determining a schedule for contact between a ground segment and a space segment, the space segment comprising a constellation of satellites in orbit, in which the number of satellites is ($N_{sat}$), and the ground segment comprising multiple ground stations, each ground station having one or more antennas, such that the overall number of ground station antennas in the ground segment is ($N_{ant}$), the method comprising:
    selecting a subset of no more than $N_{ant}$ satellites from the $N_{sat}$ satellites for contact at a given epoch with the ground segment; and
    allocating each of the selected satellites to a respective antenna in a one-to-one relationship at the given epoch;
    wherein said selecting the subset of no more than $N_{ant}$ satellites from the $N_{sat}$ satellites comprises determining a subset of no more than $N_{ant}$ satellites that has maximum spatial diversity at the given epoch.

2. The method of claim 1, wherein the determination of the schedule is subject to one or more dissemination requirements.

3. The method of claim 2, wherein the one or more dissemination requirements comprise one or more link availability requirements.

4. The method of claim 3, wherein a link availability requirement defines a set of locations and requires a predetermined number of connected satellites to be visible, from each location in the set of locations, wherein a connected satellite is a satellite in contact with a ground station antenna at the given epoch.

5. The method of claim 4, wherein the set of locations are globally distributed.

6. The method of claim 4, wherein the link availability requirement further comprises a minimum elevation angle, and a satellite is only considered to be visible from a given location if it is above this minimum elevation angle at the given epoch and location.

7. The method of claim 3, wherein the link availability requirement is to be satisfied for a predetermined proportion of epochs.

8. The method of claim 2, wherein the one or more dissemination requirements comprise a requirement for a data refresh rate that defines the maximum time interval allowed between two successive contacts between a given satellite and a ground station antenna in the ground segment.

9. The method of claim 8, wherein the step of selecting a subset of satellites further comprises selecting any satellite that would otherwise exceed said maximum allowed time interval if not allocated contact with a ground station antenna at the given epoch.

10. The method of claim 9, wherein the step of determining the subset of satellites that has a maximum spatial diversity is subject to the constraint that the determined subset must include any satellite that would otherwise exceed said maximum allowed time interval if not selected for allocation.

11. The method of claim 2, wherein the one or more dissemination requirements comprise a requirement for a minimum contact duration for each contact between a satellite and a ground station antenna.

12. The method of claim 11, wherein the step of selecting a subset of satellites further comprises selecting any satellite that was in contact with a ground station for an epoch immediately preceding the given epoch if the duration of such contact so far is less than the minimum contact duration.

13. The method of claim 12, wherein the step of determining the subset of satellites that has a maximum spatial diversity is subject to the constraint that the determined subset must include any satellite for which the duration of contact would otherwise fall short of the minimum contact duration if not selected for allocation.

14. The method of claim 2, wherein said step of allocating for the satellites for the given epoch comprises determining whether maintaining a previous allocation of satellites to respective ground station antennas for the epoch immediately preceding the given epoch would breach one or more dissemination requirements, and if not, maintaining said previous allocation for the given epoch.

15. The method of claim 1, wherein determining a subset of no more than $N_{ant}$ satellites that has maximum spatial diversity at the given epoch is performed on an iterative basis, with one satellite being excluded from the subset for each iteration, until the number of satellites in the subset is no more than $N_{ant}$ satellites.

16. The method of claim 15, wherein the satellite for excluding at a given iteration is chosen by identifying the satellite currently in the subset that contributes least to spatial diversity.

17. The method of claim 16, wherein the satellite to be excluded is chosen from the pair of satellites currently in the subset that has the smallest separation from one another.

18. The method of claim 17, wherein separation is determined based on the Great Circle Distance (GCD) between the Ground Tracks (GTs) of the two satellites.

19. The method of claim 1, wherein a satellite is allocated to a ground station by determining the number of ground stations in view of each satellite, and wherein satellites in view of fewer grounds stations are allocated first to the ground stations.

20. The method of claim 1, wherein at least one ground station comprises multiple antennas, and hence the step of allocation comprises allocating a satellite to a particular antenna of a particular ground station.

21. The method of claim 20, wherein a satellite is allocated to an antenna at a particular ground station for a given epoch according to the following priority order:
    (i) if the satellite was allocated to a particular antenna at the ground station for the epoch immediately preceding the given epoch, then maintain the allocation of the satellite to that particular antenna;

(ii) otherwise, if there was a free antenna at the ground station for the epoch immediately preceding the given epoch, then allocate the satellite to the free antenna;

(iii) otherwise, allocate the satellite to an antenna that was allocated to another satellite for the epoch immediately preceding the given epoch.

22. The method of claim 21, whereby in case (iii), the antenna allocated to the satellite having the longest contact duration is selected.

23. The method of claim 1, wherein the number of satellites, ($N_{sat}$), is greater than the number of ground station antennas($N_{ant}$).

24. The method of claim 1, wherein the satellite constellation provides at least one of: a global satellite navigation system; a satellite telephone system; and satellite data communication services.

25. The method of claim 1, wherein the satellite constellation is a Mega-constellation comprising 50 or more satellites.

26. The method of claim 1, further comprising performing contact between the ground segment and the space segment in accordance with the determined schedule, wherein said contact includes performing data communications between the antennas and the satellites.

27. The method of claim 1, wherein spatial diversity is determined as the union of the coverage areas of the allocated satellites.

28. Apparatus for determining a schedule for contact between a ground segment and a space segment, the ground segment comprising multiple ground stations, each ground station having one or more antennas, such that the overall number of ground station antennas in the ground segment is ($N_{ant}$), and the space segment comprising a constellation of satellites in orbit, in which the number of satellites is ($N_{sat}$), the apparatus being configured to:

select a subset of no more than $N_{ant}$ satellites from the $N_{sat}$ satellites for contact at a given epoch with the ground segment; and allocate each of the selected satellites to a respective antenna in a one-to-one relationship at the given epoch;

wherein said selecting the subset of no more than $N_{ant}$ satellites from the $N_{sat}$ satellites comprises determining a subset of no more than $N_{ant}$ satellites that has maximum spatial diversity at the given epoch.

29. Apparatus for controlling a ground station to provide contact between a ground segment including said ground station and a space segment, the space segment comprising a constellation of satellites in orbit, in which the number of satellites is ($N_{sat}$), and the ground segment comprising multiple ground stations, each ground station having one or more antennas, such that the overall number of ground station antennas in the ground segment is ($N_{ant}$), the apparatus being configured to perform contact with the satellites using a schedule for contact determined by:

selecting a subset of no more than $N_{ant}$ satellites from the $N_{sat}$ satellites for contact at a given epoch with the ground segment; and allocating each of the selected satellites to a respective antenna in a one-to-one relationship at the given epoch;

wherein said selecting the subset of no more than $N_{ant}$ satellites from the $N_{sat}$ satellites comprises determining a subset of no more than $N_{ant}$ satellites that has maximum spatial diversity at the given epoch.

* * * * *